(12) United States Patent
Haws

(10) Patent No.: US 9,353,955 B1
(45) Date of Patent: May 31, 2016

(54) HOT WATER RECOVERY APPARATUS

(71) Applicant: Spencer Kim Haws, Richland, WA (US)

(72) Inventor: Spencer Kim Haws, Richland, WA (US)

( * ) Notice: Subject to any disclaimer, the term of this patent is extended or adjusted under 35 U.S.C. 154(b) by 270 days.

(21) Appl. No.: 13/912,078

(22) Filed: Jun. 6, 2013

Related U.S. Application Data

(60) Provisional application No. 61/657,477, filed on Jun. 8, 2012.

(51) Int. Cl.
| | | |
|---|---|---|
| *E03B 7/04* | (2006.01) | |
| *F24D 17/00* | (2006.01) | |
| *F24D 19/10* | (2006.01) | |
| *F24H 9/02* | (2006.01) | |
| *F16L 55/054* | (2006.01) | |
| *G05D 23/13* | (2006.01) | |
| *F16L 55/05* | (2006.01) | |

(52) U.S. Cl.
CPC ............ *F24D 17/0005* (2013.01); *E03B 7/045* (2013.01); *F16L 55/05* (2013.01); *F16L 55/054* (2013.01); *F24D 17/0026* (2013.01); *F24D 17/0084* (2013.01); *F24D 19/1051* (2013.01); *F24H 9/02* (2013.01); *G05D 23/1306* (2013.01); *Y10T 137/6497* (2015.04)

(58) Field of Classification Search
CPC ... F24D 3/1016; F24D 17/00; F24D 17/0094; F24D 19/1051; F24D 17/0026; F16L 55/04; F16L 55/05; F16L 55/054; G05D 23/1306; E03B 7/045; Y10T 137/6497
USPC .......................................................... 138/30
See application file for complete search history.

(56) References Cited

U.S. PATENT DOCUMENTS

| | | | | |
|---|---|---|---|---|
| 2,838,073 | A | * | 6/1958 | Bruce et al. ...................... 138/30 |
| 2,918,090 | A | * | 12/1959 | Shelly .............................. 138/30 |
| 3,847,307 | A | * | 11/1974 | Hosek ......................... 222/386.5 |
| 4,181,156 | A | | 1/1980 | Zahid |
| 4,321,943 | A | | 3/1982 | Haws |
| 4,450,829 | A | | 5/1984 | Morita et al. |
| 4,518,007 | A | | 5/1985 | Haws |
| 4,606,325 | A | | 8/1986 | Lujan, Jr. |
| 4,628,902 | A | | 12/1986 | Comber |
| 4,672,990 | A | | 6/1987 | Robillard |
| 4,697,614 | A | | 10/1987 | Powers |
| 4,798,224 | A | | 1/1989 | Haws |

(Continued)

FOREIGN PATENT DOCUMENTS

| | | |
|---|---|---|
| CN | 201306795 | 9/2009 |
| FR | 2947615 A1 | 1/2011 |
| WO | 2010/103521 | 9/2010 |

OTHER PUBLICATIONS

PCT Patent Application PCT/US/2011/056896; International Search Report and Written Opinion dated Mar. 5, 2013.

(Continued)

*Primary Examiner* — Kevin Murphy
(74) *Attorney, Agent, or Firm* — Rainier Patents P.S.; Paul W. Mitchell; Remembrance Newcombe

(57) ABSTRACT

The concepts relate to reducing energy loss associated with hot water systems. One example includes a water flow management device that includes inner and outer nested elastomeric bladders. The inner and outer nested elastomeric bladders define a tortuous fluid pathway into the inner bladder, between the inner and outer bladders, and out of the outer bladder.

13 Claims, 18 Drawing Sheets

(56) References Cited

U.S. PATENT DOCUMENTS

| | | | |
|---|---|---|---|
| 4,930,551 | A | 6/1990 | Haws |
| 4,945,942 | A | 8/1990 | Lund |
| 5,042,524 | A | 8/1991 | Lund |
| 5,205,318 | A | 4/1993 | Massaro et al. |
| 5,261,443 | A | 11/1993 | Walsh |
| 5,277,219 | A | 1/1994 | Lund |
| 5,347,956 | A | 9/1994 | Hughes |
| 5,351,712 | A | 10/1994 | Houlihan |
| 5,385,168 | A | 1/1995 | Lund |
| 5,452,740 | A | 9/1995 | Bowman |
| 5,584,316 | A | 12/1996 | Lund |
| 5,586,572 | A | 12/1996 | Lund |
| 5,606,996 | A | 3/1997 | Sugimura |
| 5,775,372 | A | 7/1998 | Houlihan |
| 5,799,827 | A | 9/1998 | D'Andrade |
| 5,806,511 | A | 9/1998 | Hart |
| 5,819,785 | A | 10/1998 | Bardini |
| 5,829,475 | A | 11/1998 | Acker |
| 5,860,452 | A * | 1/1999 | Ellis ................................ 138/30 |
| 5,887,616 | A | 3/1999 | Ikeda et al. |
| 6,039,067 | A | 3/2000 | Houlihan |
| 6,347,748 | B1 | 2/2002 | Lyons |
| 6,418,969 | B1 * | 7/2002 | Bertagna ......................... 138/30 |
| 6,536,464 | B1 | 3/2003 | Lum et al. |
| 6,588,377 | B1 | 7/2003 | Leary et al. |
| 6,745,723 | B1 | 6/2004 | Hicks et al. |
| 6,920,844 | B1 | 7/2005 | Ismert |
| 6,935,357 | B2 | 8/2005 | Taylor et al. |
| 6,962,162 | B2 | 11/2005 | Acker |
| 7,073,528 | B2 | 7/2006 | Kempfe et al. |
| 7,077,155 | B2 | 7/2006 | Giammaria |
| 7,140,382 | B2 | 11/2006 | Kempf |
| 7,198,059 | B2 | 4/2007 | Kempf |
| 7,287,707 | B2 | 10/2007 | Kempf et al. |
| 7,475,703 | B2 | 1/2009 | Kempf |
| 7,487,923 | B2 | 2/2009 | Willsford et al. |
| 7,648,078 | B2 | 1/2010 | Kempf |
| 7,690,395 | B2 | 4/2010 | Jonte et al. |
| 7,740,182 | B2 | 6/2010 | Lum et al. |
| 7,779,857 | B2 | 8/2010 | Acker |
| 2003/0032854 | A1 | 2/2003 | Palmer |
| 2005/0034774 | A1 * | 2/2005 | Lombari et al. ................ 138/30 |
| 2006/0022062 | A1 | 2/2006 | Morris |
| 2006/0144455 | A1 | 7/2006 | Meyers et al. |
| 2007/0114297 | A1 | 5/2007 | Burningham |
| 2008/0035303 | A1 | 2/2008 | Fuller |
| 2008/0230126 | A1 | 9/2008 | Acker |
| 2008/0272116 | A1 | 11/2008 | Martucci et al. |
| 2011/0139269 | A1 | 6/2011 | Rogers |
| 2012/0097746 | A1 | 4/2012 | Haws |
| 2012/0118414 | A1 | 5/2012 | McMurtry |
| 2013/0228233 | A1 | 9/2013 | Haws |
| 2013/0327790 | A1 | 12/2013 | Ryan |
| 2015/0377497 | A1 | 12/2015 | Haws |
| 2016/0003485 | A1 | 1/2016 | Haws |

OTHER PUBLICATIONS

Cuta, F., "Hot Water Saver—Documenting the Correspondence Between Our Two Calculations of Energy Savings", Battelle Study Final Report, 5 pages, Apr. 22, 1985.

Skumatz et al., "Assesment of Savings and Operating Characteristics of the Hot Water Saver: Residential Test Analysis", Battelle Study, 48 pages, Dec. 31, 1983.

PCT Patent Application PCT/US2011/056896; International Preliminary Report on Patentability dated Apr. 23, 2013 and Transmitted May 2, 2013, 11 pages.

Non-Final Office Action mailed Aug. 5, 2015 from U.S. Appl. No. 13/276,635, 7 pages.

Response filed Dec. 4, 2015 to Non-Final Office Action mailed Aug. 5, 2015 from U.S. Appl. No. 13/276,635, 8 pages.

Notice of Allowance mailed Aug. 10, 2015 from U.S. Appl. No. 13/864,943, 5 pages.

Haws, Spencer Kim, U.S. Appl. No. 61/637,173, filed Apr. 23, 2012 entitled "Hot Water Recovery," 118 pages.

Haws, Spencer Kim, U.S. Appl. No. 61/657,477, filed Jun. 8, 2012 entitled "Hot Water Recovery Apparatus," 19 pages.

First Office Action mailed Oct. 29, 2015 from China Patent Application No. 201180043700.3, 14 pages.

Notice of Allowance mailed Feb. 8, 2016 from U.S. Appl. No. 13/276,635, 15 pages.

Notice of Incomplete Reply mailed Dec. 1, 2011 from U.S. Appl. No. 13/276,635, 2 pages.

Response to Notice of Incomplete Reply filed Dec. 5, 2011 from U.S. Appl. No. 13/276,635, 4 pages.

Requirement for Restriction/Election mailed Jun. 3, 2014 from U.S. Appl. No. 13/276,635, 6 pages.

Response filed Jul. 10, 2014 to Restriction/Election mailed Jun. 3, 2014 from U.S. Appl. No. 13/276,635, 9 pages.

Non-Final Office Action mailed Aug. 13, 2014 from U.S. Appl. No. 13/276,635, 7 pages.

Response filed Nov. 12, 2014 from U.S. Appl. No. 13/276,635, 8 pages.

Non-Final Office Action mailed Dec. 29, 2014 from U.S. Appl. No. 13/276,635, 6 pages.

Applicant Initiated Interview Summary mailed Feb. 11, 2015 from U.S. Appl. No. 13/276,635, 3 pages.

Response filed Mar. 17, 2015 from U.S. Appl. No. 13/276,635, 9 pages.

Final Office Action mailed Apr. 28, 2015 from U.S. Appl. No. 13/276,635, 10 pages.

Response filed Jul. 23, 2015 from U.S. Appl. No. 13/276,635, 11 pages.

Non-Final Office Action mailed Jul. 14, 2015 from U.S. Appl. No. 13/864,943, 7 pages.

U.S. Appl. No. 61/384,206, filed Sep. 17, 2010, entitled "Automatic Hot Water Recovery Apparatus,", 10 pages.

U.S. Appl. No. 61/405,359, filed Oct. 21, 2010, entitled "Hot Water Recovery", 31 pages.

Notice of Division of Application mailed Jun. 1, 2015 from Chinese Patent Application No. 201180043700.3, 2 Pages.

Response Filed Jul. 24, 2015 to the Non-Final Office Action Mailed Jul. 14, 2015 From U.S. Appl. No. 13/864,973, 6 Pages.

\* cited by examiner

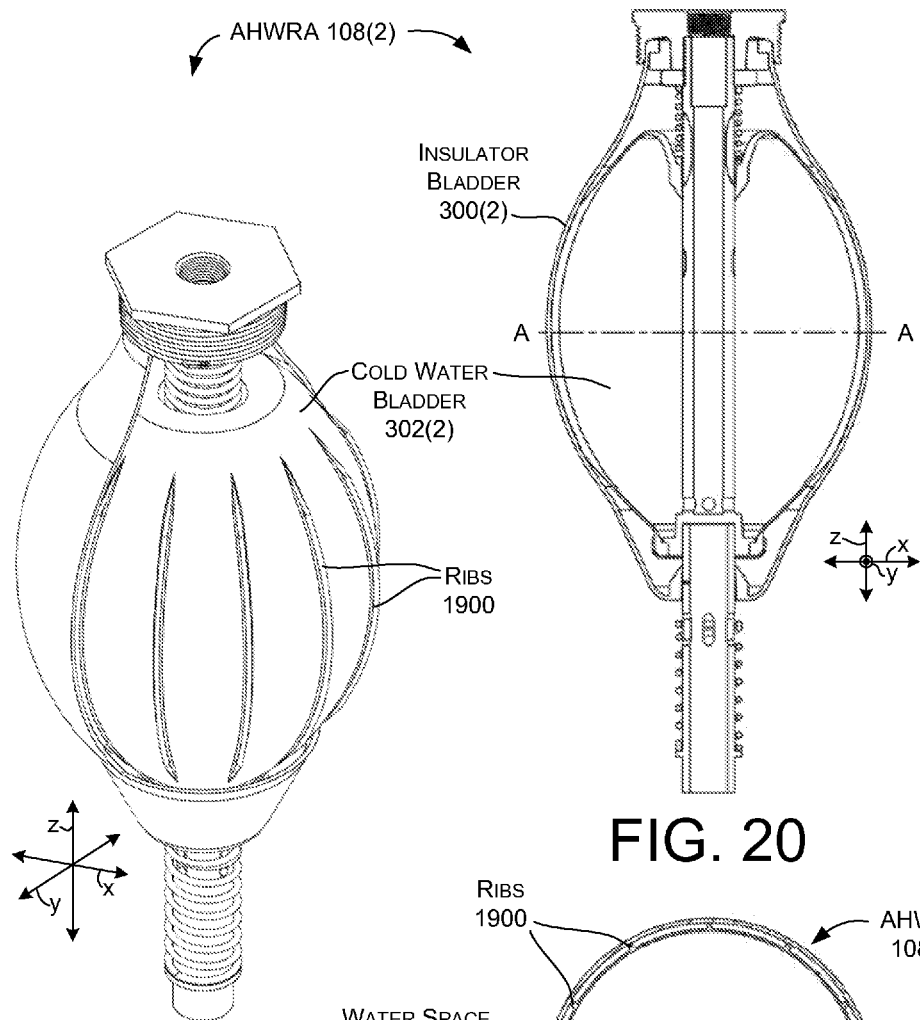
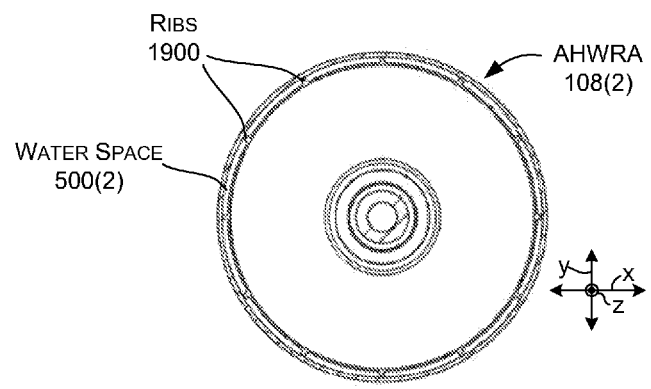

HOT WATER RECOVERY APPARATUS

PRIORITY

This utility application claims priority from U.S. Provisional Application No. 61/657,477 filed on 2012 Jun. 8, which is incorporated by reference in its entirety.

FIELD OF THE INVENTION

The patent relates to energy savings, especially energy savings associated with hot water and hot water heaters.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIGS. 3-18 and 20-35 show sectional views of automatic hot water recovery apparatuses in accordance with some implementations.

FIG. 19 shows a partial cut-away perspective view of an automatic hot water recovery apparatus in accordance with some implementations.

DETAILED DESCRIPTION

Overview

Figure 1:
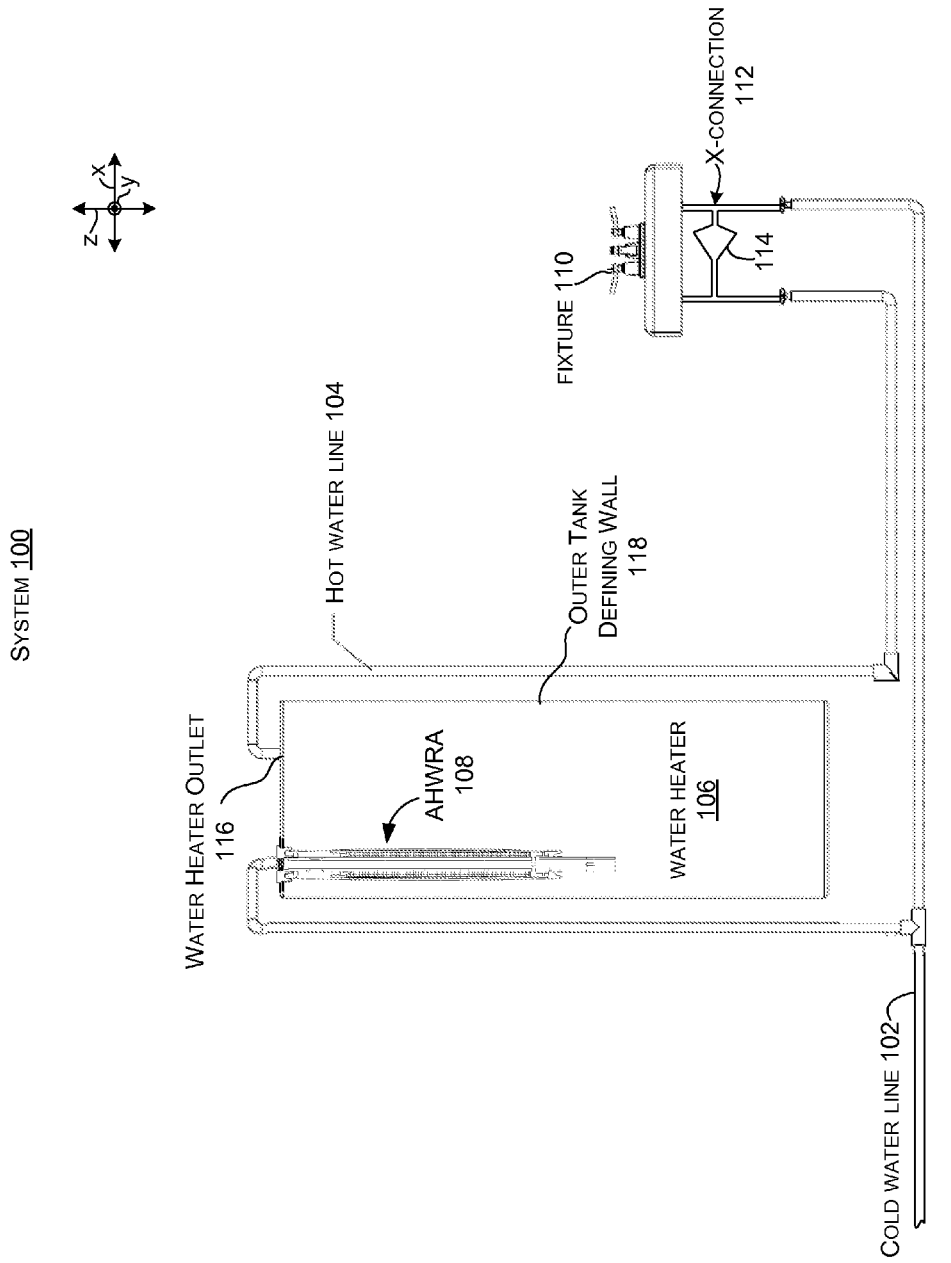
FIGS. 1 and 2 show a system in which the present hot water recovery concepts can be applied in accordance with some implementations.

The present description relates to saving energy by recovering hot water so that energy in the hot water is not lost to the environment. In one case, the energy savings can be accomplished via an automatic hot water recovery apparatus (AHWRA).

In one scenario, the automatic hot water recovery apparatus can be installed in a water system to reduce energy consumption. The water system can include an unheated supply (cold water). Some of the cold water can be supplied to a 'hot water tank' or 'water heater'. An end use device or fixture, such as a faucet, can be supplied with a hot water line from the water heater and a cold water line from the unheated supply. A one way cross-over device can be installed proximate to the end use device so that in some circumstances water can flow from the cold water line to the hot water line, but not vice versa.

The automatic hot water recovery apparatus can be located inside the water heater, immersed in the hot water, and can be integrated into the water supply system. The automatic hot water recovery apparatus can receive cold water at a cold water inlet port from the cold water line and emit water into the water heater. The automatic hot water recovery apparatus can decrease energy use by reducing energy loss from hot water that is 'stranded' in the hot water line, between the hot water heater and the end use device or fixture. Stated another way, after a user runs the hot water at the fixture, the automatic hot water recovery apparatus can cause hot water in the hot water line to be drawn back into the hot water heater and thereby reduce heat loss. The automatic hot water recovery apparatus can further reduce energy consumption in the water heater by capturing and insulating (e.g., isolating) incoming cold water from the surrounding hot water. This cold water is then returned to the cold water line as the hot water is recovered into the water heater from the hot water line. Stated another way, the automatic hot water recovery apparatus can be thought of as a water flow management device that is configured to manage water flow to save energy.

In one implementation, the automatic hot water recovery apparatus can be a single, insulated expandable bladder inside the water heater. In this case, the expandable bladder can receive cold water from the cold water inlet port when hot water is flowing at the fixture. The in-flowing water can cause the automatic hot water recovery apparatus to expand. The increased volume of the hot water recovery apparatus immersed in the hot water can cause hot water to flow out of the water heater into the hot water line. In this case, incoming cold water can be insulated from the surrounding hot water in the water heater. The automatic hot water recovery apparatus can be designed such that when it is fully expanded, additional inflowing cold water flows through the automatic hot water recovery apparatus into the water heater. In this manner, continued use of hot water at the fixture can cause water to flow continuously from the cold water line, through the automatic hot water recovery apparatus, and into the water heater.

In other implementations, automatic hot water recovery apparatuses can include multiple bladders. For example, two bladders can be placed in series, such that cold water from a cold water line is drawn into a first bladder and then into a second bladder. For example, a first bladder can be insulated such that cold water inside the first bladder is insulated from the hot water in the water heater. In another implementation, a first bladder can be nested inside a second bladder. In this case, the second, outer bladder can provide the insulation for the incoming cold water in the inner bladder against the heat of hot water in the water heater.

In the case of the nested bladders, when a user opens a hot water tap at the fixture, the inner elastomeric bladder of the automatic hot water recovery apparatus can be stretched from a first configuration to a second configuration by a water pressure difference in the system, allowing water movement from the cold water line into the automatic hot water recovery apparatus. As the inner elastomeric bladder is stretched, it can push against and stretch the second, outer elastomeric bladder. The expansion of the second elastomeric bladder into the interior volume of the hot water heater can cause water from the hot water heater to flow into the hot water line. As hot water usage at the fixture continues, the inner elastomeric bladder can be stretched so that one end of the inner elastomeric bladder moves to allow water to flow into the second, outer elastomeric bladder. The outer elastomeric bladder can then be stretched further by the water pressure difference, beyond the expansion that came from the inner elastomeric bladder pushing against it. The continued expansion of the second elastomeric bladder into the interior volume of the hot water heater can continue to cause water from the hot water heater to flow into the hot water line. At this point the incoming cold water can continue to be insulated from the hot water in the water heater by keeping it contained within the inner and outer bladders.

As hot water usage at the fixture continues, due to the water pressure difference across the automatic hot water recovery apparatus the outer elastomeric bladder may then be stretched further so that one end allows the incoming cold water to flow from the second elastomeric bladder, out through the flow tube slots, and into the water heater. At this point the incoming cold water can flow continuously from the cold water line, through the inner elastomeric bladder, through the outer elastomeric bladder, and into the water heater. As such, incoming cold water is not directly mixed with the hot water in the water heater until the bladders are fully expanded or nearly fully expanded.

Under different conditions, such as when the user closes the hot water tap at the fixture, the elastic nature of the inner and outer elastomeric bladders or the resilient bias of the bladders to return to their original collapsed (e.g., contracted, deflated) configurations can reverse the flow and draw water back into the automatic hot water recovery apparatus. This action can in turn draw hot water from the hot water line back into the water heater. As mentioned above, hot water recovery systems can connect hot and cold water lines near the point of use, at a distant point from the water heater, using a one way cross-over device. After hot water is used and the user closes the tap at the fixture, cold water can flow through this cross-over connection into the hot water line, slowly filling it with cold water as the stranded hot water is drawn back into the water heater by the automatic hot water recovery apparatus.

Automatic hot water recovery apparatuses can be integrated with water heaters, or may be added to existing water heaters. For example, automatic hot water recovery apparatuses can have threaded couplings that fit the cold water inlet port of existing water heaters. In this case, the automatic hot water recovery apparatus can fit through the cold water inlet port of the water heater when the automatic hot water recovery apparatus is in the original, collapsed configuration. Of course, other structures for adding the automatic hot water recovery apparatus into the water supply system are contemplated.

First System Example

FIG. 1 shows a system 100 to which the present hot water recovery concepts can be applied. Of course, system 100 is provided for purposes of explanation and the present concepts can be applied to other systems. System 100 includes a cold water line 102, a hot water line 104, a water heater 106, and an automatic hot water recovery apparatus (AHWRA) 108. The automatic hot water recovery apparatus 108 is positioned inside the water heater, in fluid flowing relation to the cold water line 102. System 100 also includes an end use device 110, a cold water cross-over connection (x-connection) 112 and a one-way valve 114, which will be described below. The water heater 106 has a water heater outlet 116, which is in fluid flowing relation to the hot water line 104. The water heater 106 can also include an outer tank defining wall 118 that can generally define a volume of the hot water heater.

Figure 2:
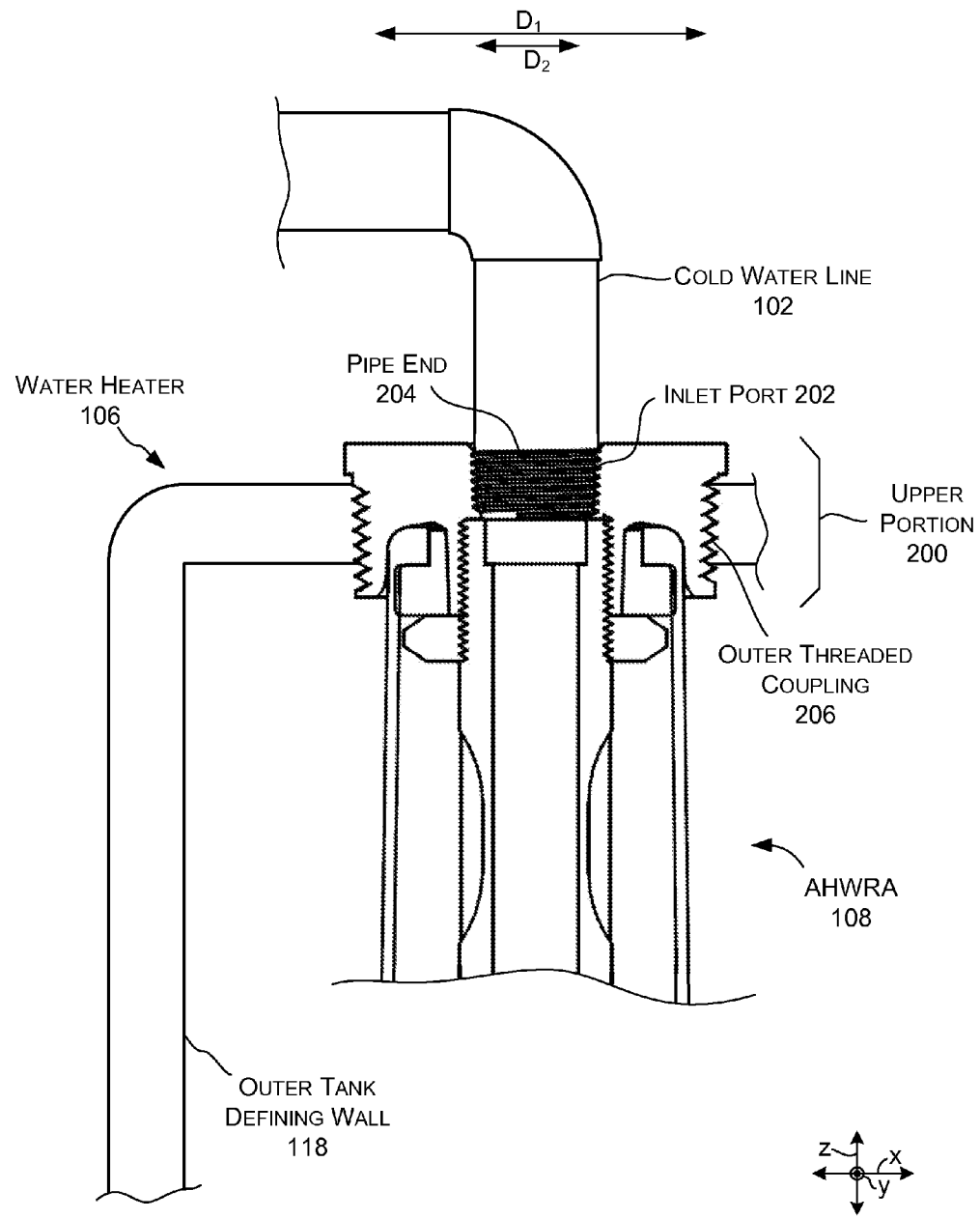

FIG. 2 shows a close-up view of a portion of the automatic hot water recovery apparatus 108 of system 100. In this case, an upper portion 200 of the automatic hot water recovery apparatus is shown, illustrating the connection of the automatic hot water recovery apparatus to cold water line 102 at the top of water heater 106. In some configurations, the automatic hot water recovery apparatus can be integral to the water heater. In other cases the automatic hot water recovery apparatus can be added to an existing water heater. For instance, in a collapsed configuration, the automatic hot water recovery apparatus can be inserted into the top of the water heater where the cold water line enters the water heater. The automatic hot water recovery apparatus is illustrated in a vertical orientation at the top of the water heater. Or course, the automatic hot water recovery apparatus could be positioned and/or oriented differently relative to the water heater.

FIG. 2 illustrates one example of a way to fluidly connect automatic hot water recovery apparatus 108, cold water line 102, and water heater 106. Other types of connections or interfaces between the automatic hot water recovery apparatus, the cold water line, and the water heater are contemplated. In the illustrated configuration, the upper portion 200 of the automatic hot water recovery apparatus can have a female threaded inlet port 202 for receiving a male threaded cold water line pipe end 204. The inlet port 202 and female threaded connection can be sized to receive a standard size cold water line pipe end. In the illustrated example, the water heater includes a threaded female coupling for receiving a corresponding male outer threaded coupling 206 of the automatic hot water recovery apparatus. Further, the threaded female coupling in the hot water heater and the corresponding male outer threaded coupling of the automatic hot water recovery apparatus can be in a range of 2-5 inches (designated as diameter $D_1$). Similarly, the automatic hot water recovery apparatus can define a female thread in the range of ½ to 2 inches (designated as diameter $D_2$) for receiving the cold water line. For example, the automatic hot water recovery apparatus can define a female thread of ¾ inches (designated as diameter $D_2$) for receiving the cold water line. In other cases, the automatic hot water recovery apparatus can be designed to fit through an existing standard cold water inlet port (such as in a range from ½" to 1"). For example, the automatic hot water recovery apparatus can be designed to fit through a ¾ inch opening (e.g., diameter $D_1$) to connect to the water heater with a ¾ inch male threaded coupling. The automatic hot water recovery apparatus can then define a threaded ¾ inch opening (e.g., diameter $D_2$) for receiving the cold water line.

Referring again to FIG. 1 in this case, fixture 110 is manifest as a faucet, but other types of fixtures, such as dishwashers and/or clothes washers can be employed. From one perspective, a fixture can be thought of as any device that offers the ability to control the flow of water, including hot water. In this case, cold water cross-over connection (x-connection) 112 is provided proximate to fixture 110. The cold water cross-over connection can connect cold water line 102 and hot water line 104, and can function to allow cold water to flow into the hot water line, but block water from the hot water line flowing to the cold water line. For instance, the cold water cross-over connection can employ one-way valve 114 to control the water flow. Scenarios in which cold water could flow from the cold water line to the hot water line are described below.

In another implementation, cold water cross-over connection 112 can employ a selective hot water isolation device that only allows cold water to enter hot water line 104 under selective conditions. The selective hot water isolation device can allow cold water cross-over in a period or window after hot water flows through fixture 110. The window can start immediately upon cessation of the hot water flow through the fixture or begin after a delay period. Thus, for example, a user that is intermittently using hot water is not inconvenienced by cold water entering the hot water line through the selective hot water isolation device.

Automatic Hot Water Recovery Apparatus Examples

FIGS. 3-18 collectively illustrate a first automatic hot water recovery apparatus 108(1). FIGS. 19-21 collectively illustrate a second automatic hot water recovery apparatus 108(2). FIGS. 22-35 collectively illustrate a third automatic hot water recovery apparatus 108(3).

Figures 3, 4:
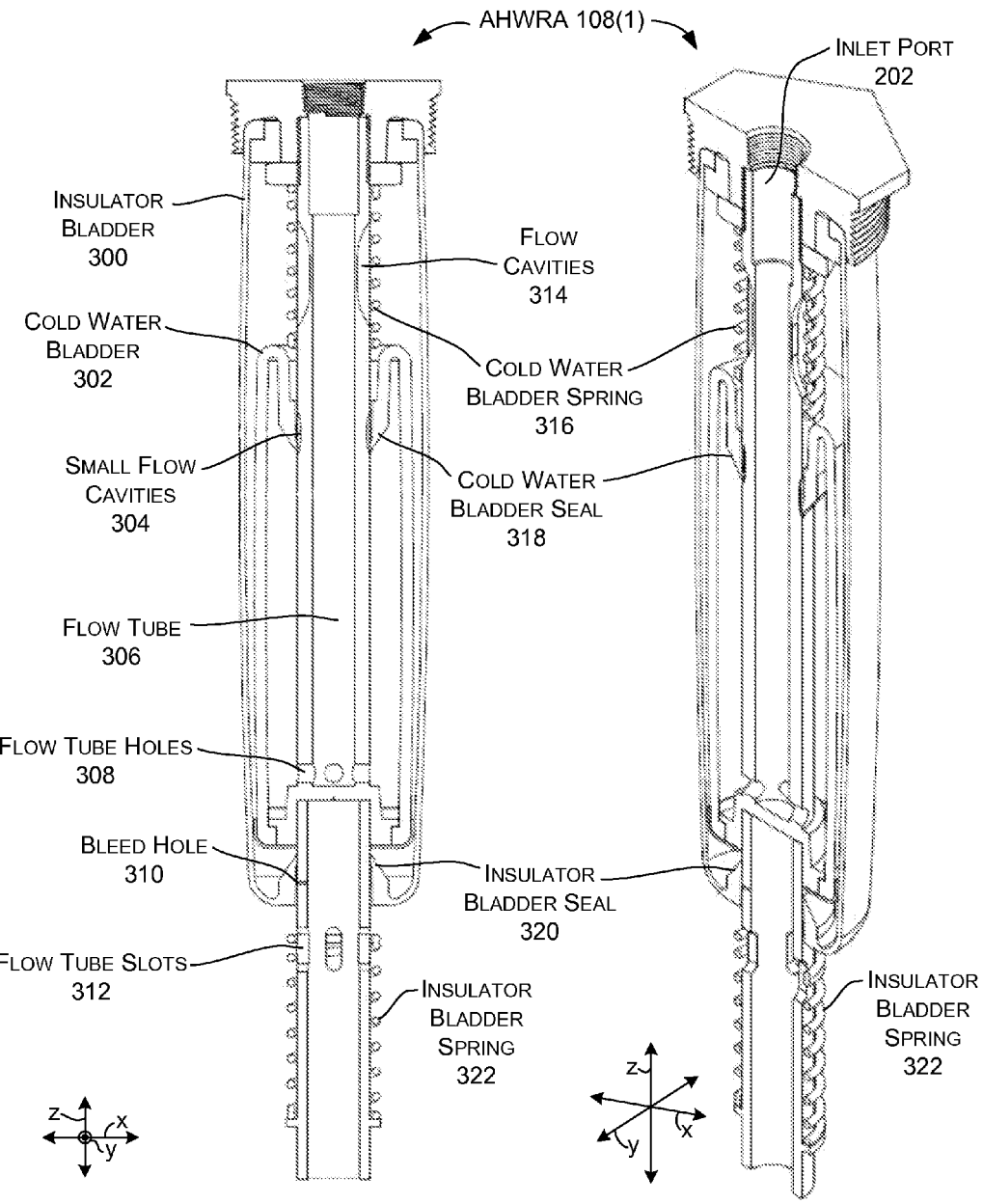

FIGS. 3-18 collectively show automatic hot water recovery apparatus 108(1). Referring to FIGS. 3 and 4, the automatic hot water recovery apparatus includes an insulator bladder 300, a cold water bladder 302, small flow cavities 304, a flow tube 306, flow tube holes 308, a bleed hole 310, flow tube slots 312, flow cavities 314, a cold water bladder spring 316, a cold water bladder seal 318, an insulator bladder seal 320, and an insulator bladder spring 322.

Cold water bladder 302 and insulator bladder 300 can be elastomeric in nature to aid the operation of automatic hot water recovery apparatus 108(1) as will be described below. Inlet port 202 can be at the top end of flow tube 306 for receiving water into the flow tube. At the lower end of the flow tube, flow tube holes 308 can allow water to pass out of the flow tube and into cold water bladder 302. At the lower end of the automatic hot water recovery apparatus, flow tube slots 312 can allow water to flow out of the automatic hot water recovery apparatus into water heater 106 (FIG. 1).

FIGS. 3 and 4 show the automatic hot water recovery apparatus 108(1) in a steady-state or rest position where hot water has not been used recently. At this point, water pressure at cold water inlet port 202 and flow tube slots 312 is generally equal and no water is flowing through the automatic hot water recovery apparatus. Insulator bladder 300 and cold water bladder 302 can be characterized as being in a resting or non-stretched configuration. The elastomeric bladders can be stretched from this configuration but have a resilient bias to return to this collapsed configuration.

Figures 5, 6:
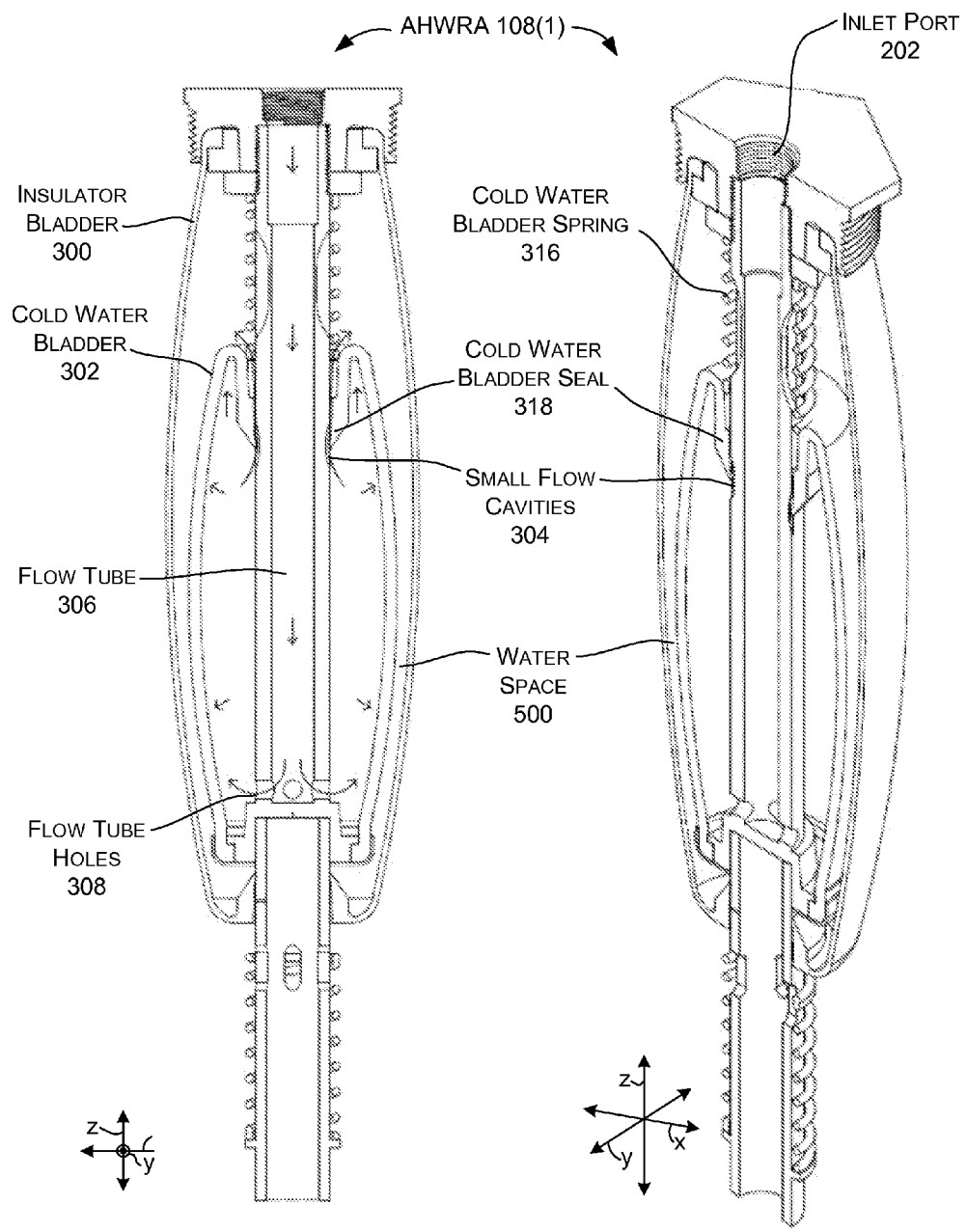

In FIGS. 5 and 6, the hot water is turned on (such as at fixture 110 of FIG. 1). In such a case, water pressure drops (e.g., changes) at water heater outlet 116 (FIG. 1), and therefore also inside water heater 106 (FIG. 1), but outside automatic hot water recovery apparatus 108(1). As such, the water pressure can be lower on the outside of the automatic hot water recovery apparatus as compared to the inside. The difference in water pressure outside and inside the automatic hot water recovery apparatus can overcome the resilient bias of elastomeric cold water bladder 302, causing the cold water bladder to be expanded by water flowing into the automatic hot water recovery apparatus from cold water line 102 (FIG. 1). This can allow water to flow in through inlet port 202 into flow tube 306, through flow tube holes 308, and into the cold water bladder. Water can also pass from the cold water bladder through small flow cavities 304 into insulator bladder 300.

Flow of water from cold water bladder 302 into insulator bladder 300 can purge heat that may have accumulated in the cold water bladder during standby. For example, during standby, heat from hot water in water heater 106 (FIG. 1) can pass through automatic hot water recovery apparatus 108(1) into the cold water bladder and/or into flow tube 306. When the hot water is turned on and cold water flows into the flow tube, it can push water from the flow tube, which may have accumulated some of the heat, into the cold water bladder and through to the insulator bladder purging the heat from the cold water bladder and/or the flow tube. The water that passes through small flow cavities 304 into the insulator bladder creates a water space 500 between the outside wall of the cold water bladder and the inside wall of the insulator bladder. Additional discussion of this water space between the bladders is provided below.

The incoming water starts to fill cold water bladder 302 which can cause the bladder to continue to stretch as the resilient bias of the bladder is further overcome by the difference in water pressure between the inside and outside of automatic hot water recovery apparatus 108(1). In some cases, the automatic hot water recovery apparatus can be configured to cause the cold water bladder to expand in a specific manner. In this case, cold water bladder spring 316 can create more resistance to vertical expansion/movement (parallel to the z-reference axis) and thereby promote horizontal expansion of the bladder (parallel to the x and y-reference axes). Stated another way, the automatic hot water recovery apparatus can be configured to promote expansion of the cold water bladder orthogonal to a length of flow tube 306 before the cold water bladder expands along the length of the flow tube. As the cold water bladder continues to expand, the resistance of the cold water bladder spring will be overcome. As the resistance of the cold water bladder spring is overcome and the cold water bladder expands in the vertical direction, cold water bladder seal 318 can slide vertically (parallel to the z-reference axis), upward along the flow tube. The cold water bladder seal can be mounted so that it can slide vertically along the flow tube while maintaining a water-tight seal against the flow tube.

Figures 7, 8:
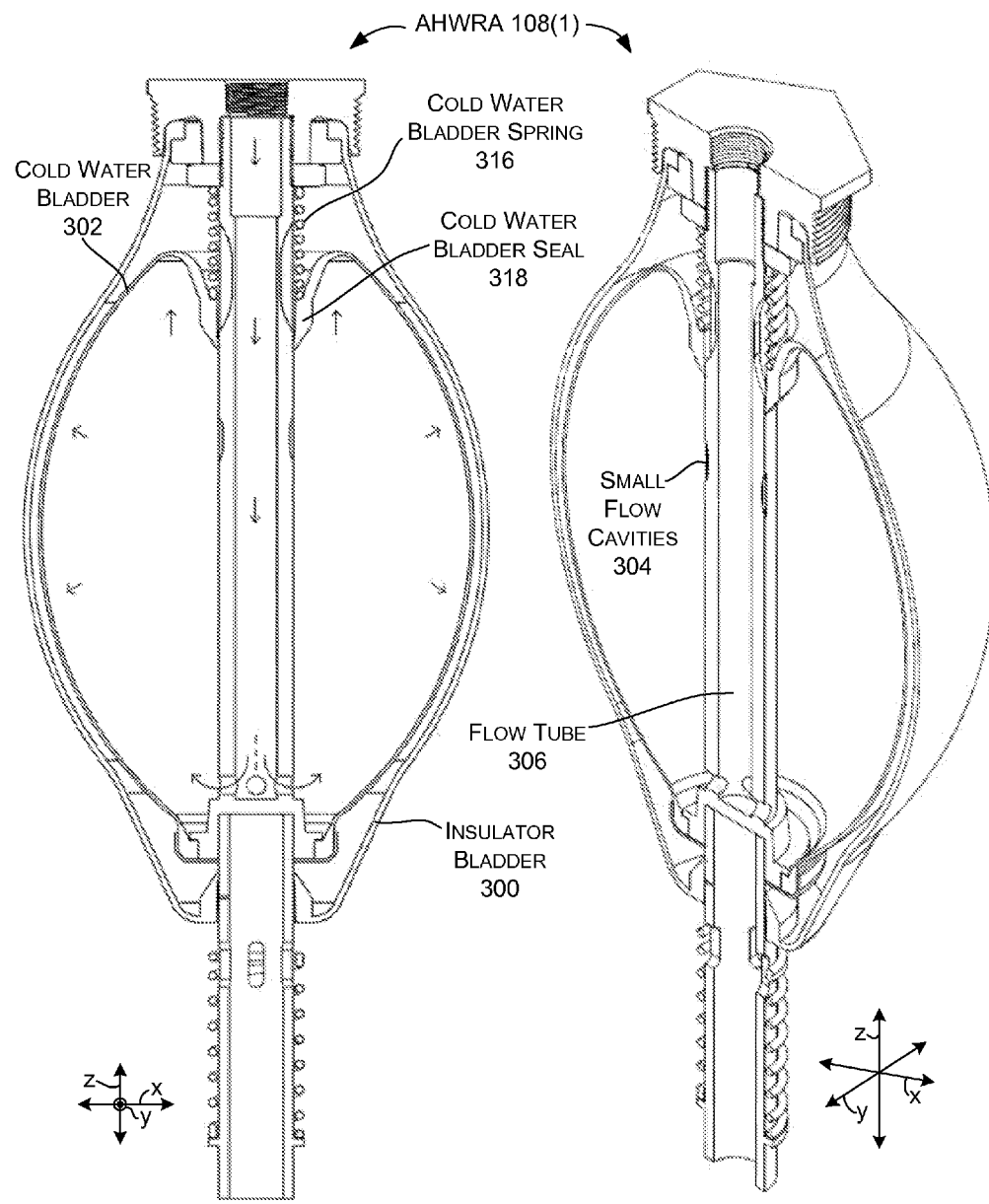

FIGS. 7 and 8 illustrate automatic hot water recovery apparatus 108(1) as it continues to charge with incoming cold water. At this point, cold water bladder 302 continues to expand due to water pressure from the water entering the cold water bladder from flow tube 306. The cold water bladder is stretching vertically as well as horizontally, and has partially compressed cold water bladder spring 316. Cold water bladder seal 318 has moved (e.g., slid) vertically, upward along the flow tube, to a point where water no longer flows through small flow cavities 304 from the cold water bladder into insulator bladder 300.

Figures 9, 10:
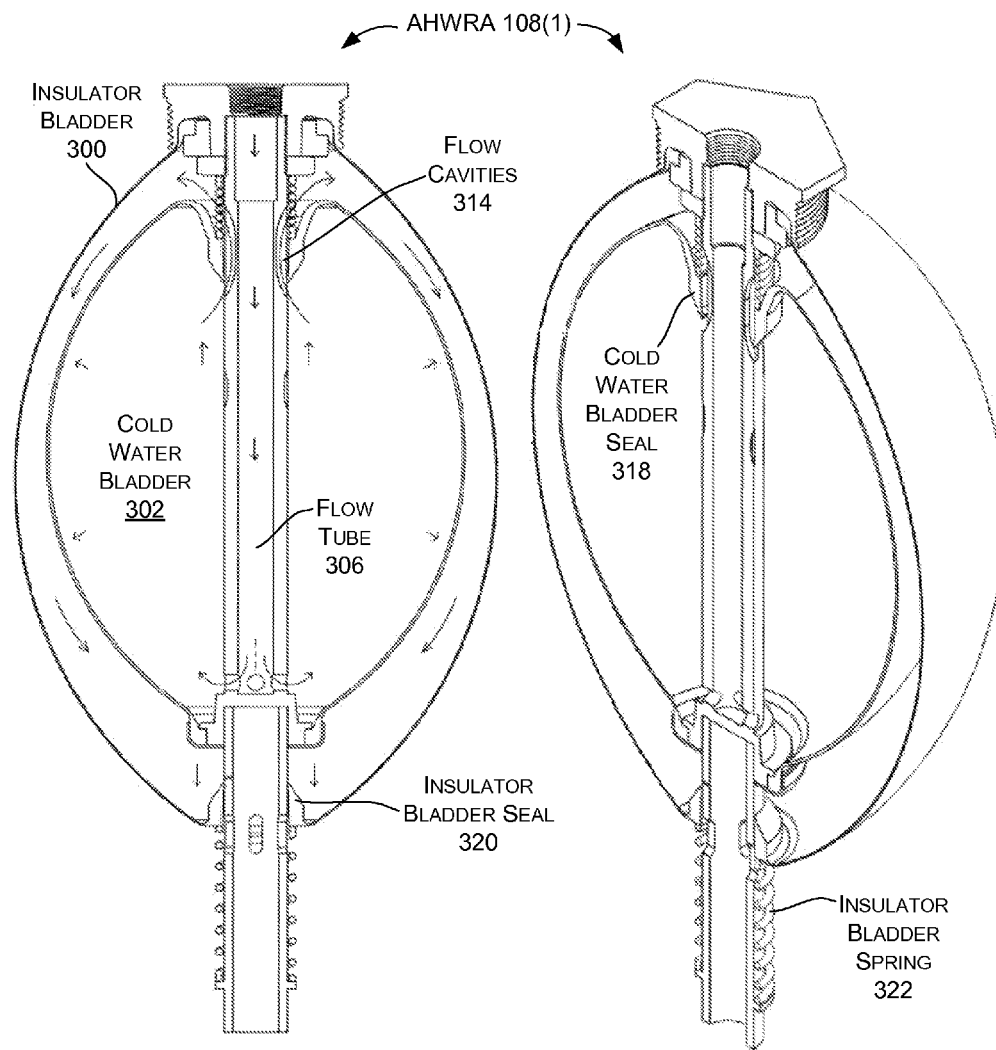

FIGS. 9 and 10 illustrate automatic hot water recovery apparatus 108(1) at a point where cold water bladder seal 318 has reached flow cavities 314. In this configuration water can flow out of cold water bladder 302 into insulator bladder 300. In some cases, the automatic hot water recovery apparatus can be configured to cause the insulator bladder to expand in a specific manner. In this case, insulator bladder spring 322 can create more resistance to vertical expansion/movement (parallel to the z-reference axis) and thereby promote horizontal expansion of the insulator bladder (parallel to the x and y-reference axes). Stated another way, the automatic hot water recovery apparatus can be configured to promote expansion of the insulator bladder orthogonal to a length of flow tube 306 before the insulator bladder expands along the length of the flow tube. As the insulator bladder continues to expand, the resistance of the insulator bladder spring will be overcome. As the resistance of the insulator bladder spring is overcome and the insulator bladder expands in the vertical direction, insulator bladder seal 320 can slide vertically (parallel to the z-reference axis), downward along the flow tube. The insulator bladder seal can be mounted so that it can slide vertically along the flow tube while maintaining a water-tight seal against the flow tube.

Figures 11, 12:
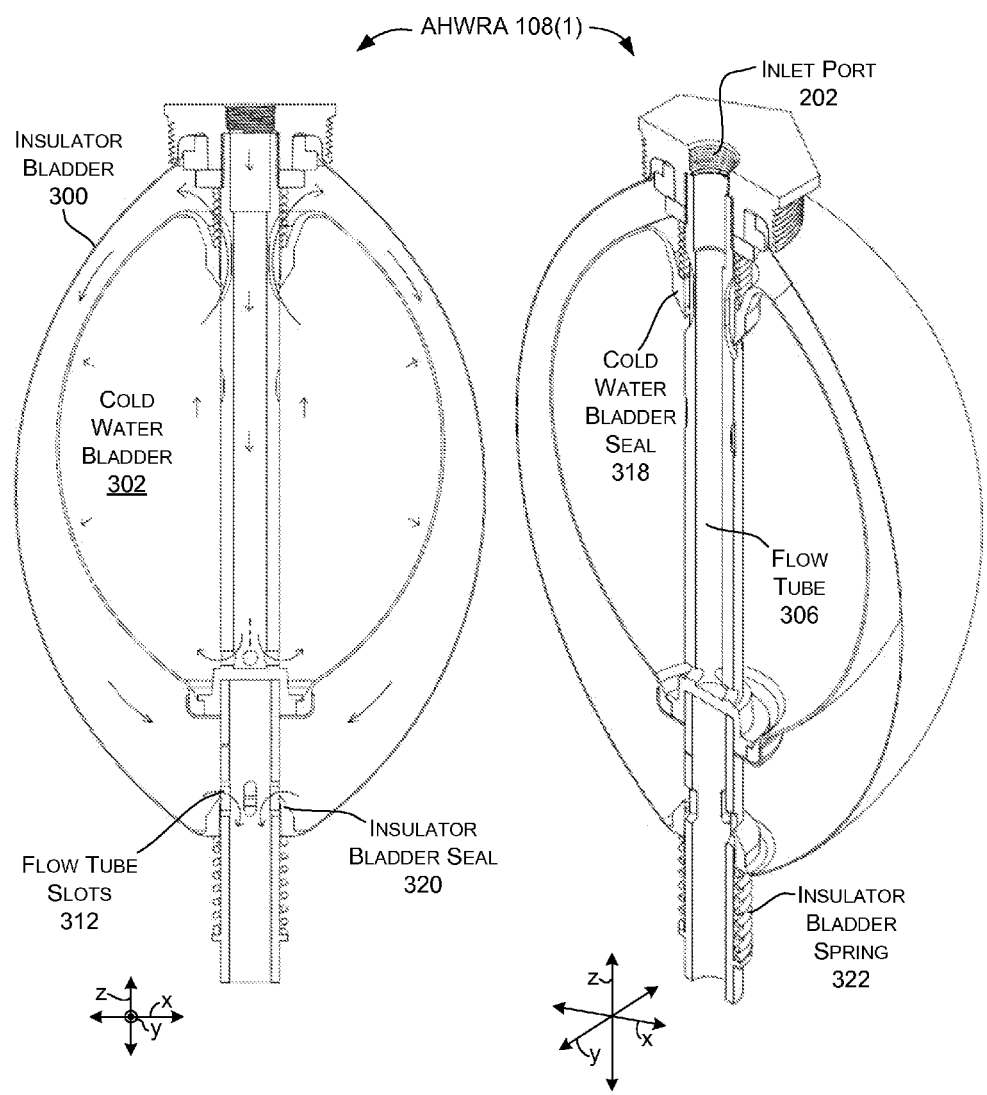

In FIGS. 11 and 12, cold water bladder 302 and insulator bladder 300 are in fully expanded configurations. Insulator bladder seal 320 has moved vertically downward to flow tube slots 312, allowing water to flow freely through automatic hot water recovery apparatus 108(1) as hot water is being used. Cold water bladder seal 318 and insulator bladder seal 320 can remain in this position, and the cold water bladder and the insulator bladder can remain expanded as the water freely flows through the automatic hot water recovery apparatus from cold water inlet port 202 out through the flow tube slots.

Figures 13, 14:
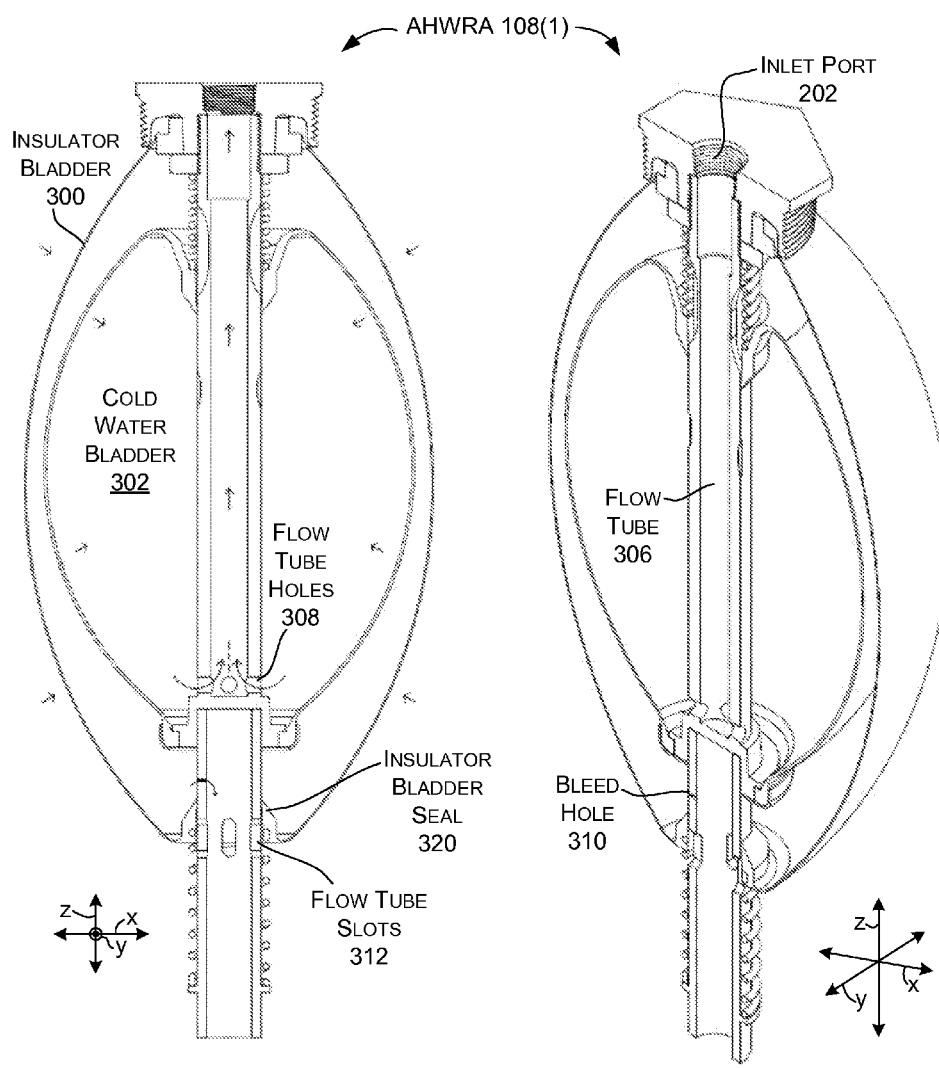

FIGS. 13 and 14 show automatic hot water recovery apparatus 108(1) when the hot water is turned off (such as at fixture 110 of FIG. 1). At this point, the pressure difference between cold water inlet port 202 and flow tube slots 312 can lessen. When the pressure difference lessens, expanded cold water bladder 302 can begin to deflate due to its resilient nature. Flow of cold water inside the cold water bladder can be reversed, such that water flows out of the cold water bladder through flow tube holes 308, into flow tube 306, and back out through the inlet port into cold water line 102 (FIG. 1). The expanded insulator bladder 300 can also deflate. As both bladders deflate (due to their resilient bias), bleed hole 310 can allow some of the volume of water between the bladders to pass into water heater 106 (FIG. 1), allowing the insulator bladder to continue to deflate.

In this configuration insulator bladder seal 320 has begun to slide vertically upward along flow tube 306, such that the insulator bladder seal has risen past flow tube slots 312, and water is no longer flowing freely from inside insulator bladder 300, through the flow tube slots, and out into water heater 106 (FIG. 1). This implementation can delay drawing water backwards (e.g., from the flow tube slots toward cold water inlet port 202) so that hot water remains readily available to the user. For instance, the user may be running the hot water intermittently as he shaves and brushes his teeth. In this implementation, the delay feature is provided by the fact that the insulator bladder is prevented from collapsing quickly because the space between the insulator bladder and cold water bladder 302 is isolated from the water heater except for bleed hole 310. The rate of collapse can be controlled by a small flow of water out of the automatic hot water recovery apparatus 108(1) through the bleed hole. In summary, this feature allows hot water to be (immediately) available to the user for a short period of time after each hot water draw.

Referring to FIGS. 1, 13, and 14, as insulator bladder 300 and cold water bladder 302 collapse (due to their resilient bias), the flow in hot water line 104 can reverse and hot water can be pulled back into the water heater outlet 116 while water in the bladders of automatic hot water recovery apparatus 108(1) is forced out cold water inlet port 202 into cold water line 102. This action can pull heated water back into water heater 106 from the hot water line extending from the water heater to fixture 110. This scenario leverages cross-over connection 112 introduced above relative to FIG. 1. As the automatic hot water recovery apparatus draws water back along the hot water line and back into the water heater, the pressure in the hot water line is lower than pressure in the cold water line on the other side of the cross-over connection. Due to this pressure difference, the cross-over connection can allow cold water to flow from the cold water line into the hot water line to replace the volume of water that is drawn back by the automatic hot water recovery apparatus into the water heater. The energy contained in the heated water that is drawn back into the water heater would otherwise be lost as this water cooled in the hot water line. Of course, some heat loss can occur from the water heater, but the water heater has less relative surface area and tends to be better insulated than the hot water line.

Figures 15, 16:
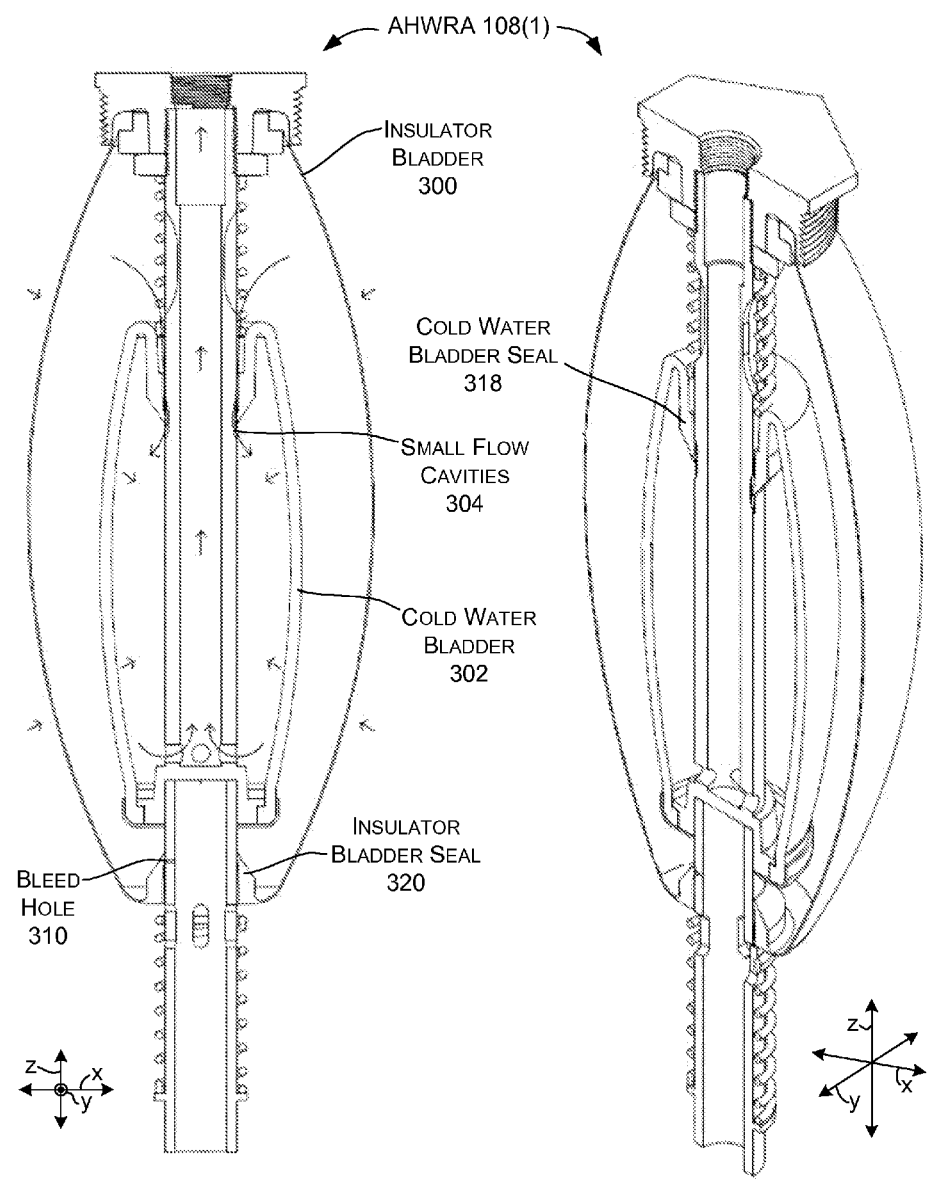
Figures 17, 18:
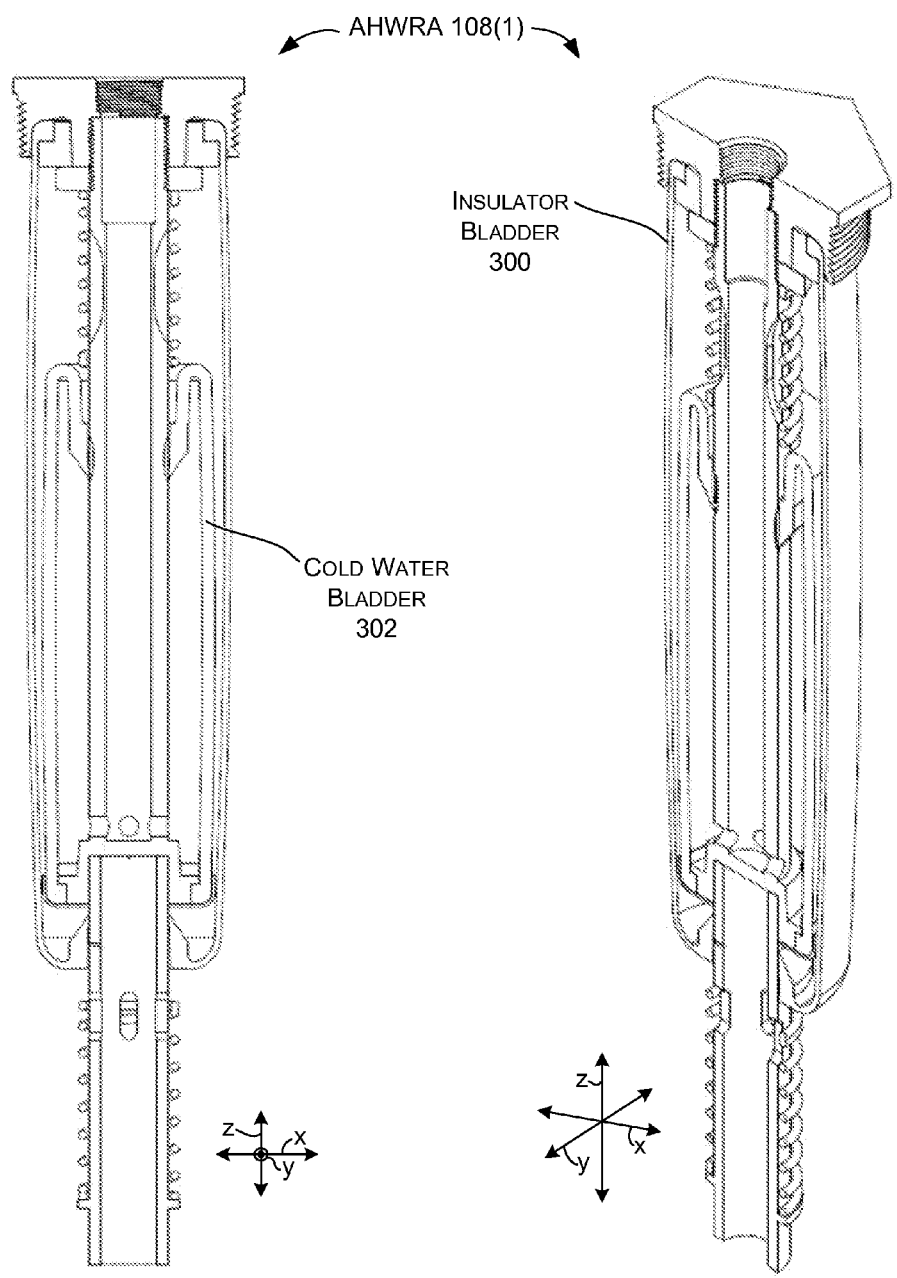

FIGS. 15 and 16 illustrate the continued recovery of automatic hot water recovery apparatus 108(1) toward the original collapsed configuration of FIGS. 3 and 4. At this point insulator bladder seal 320 has passed bleed hole 310 so that water is no longer flowing from inside insulator bladder 300 out into water heater 106 (FIG. 1). Also, cold water bladder seal 318 has reached small flow cavities 304, allowing the remaining water inside the insulator bladder to flow through the small flow cavities into cold water bladder 302 as both bladders completely deflate (e.g., collapse) to the steady-state, or rest position. Thus, contraction of the bladders forces a volume of water generally equivalent to the volume of the cold water bladder back into cold water line 102 (FIG. 1). This volume of water is replaced in the water heater by water drawn back from hot water line 104 (FIG. 1). FIGS. 17 and 18 illustrate automatic hot water recovery apparatus 108(1) in the rest position, with cold water bladder 302 and insulator bladder 300 deflated.

FIGS. 19-21 collectively illustrate another automatic hot water recovery apparatus 108(2). In this example, the automatic hot water recovery apparatus includes ribs 1900 between cold water bladder 302(2) and insulator bladder 300(2). As shown, the ribs are molded as part of the cold water bladder, extending vertically along the outer wall of the cold water bladder. Of course, the ribs could be alternately or additionally formed on the inner wall of the insulator bladder. As introduced above, a water space 500(2) can be created between the cold water bladder and the insulator bladder (see FIGS. 5 and 6). This water space can help to distribute flow evenly around the outside of the cold water bladder and insulate the cold water inside the cold water bladder from heat in water heater 106 (FIG. 1). The ribs can improve the uniformity of the water space, further improving the even flow distribution and insulation effects. Other implementations of the automatic hot water recovery apparatus can include a variety of rib shapes, sizes, and placements.

Figures 22, 23:
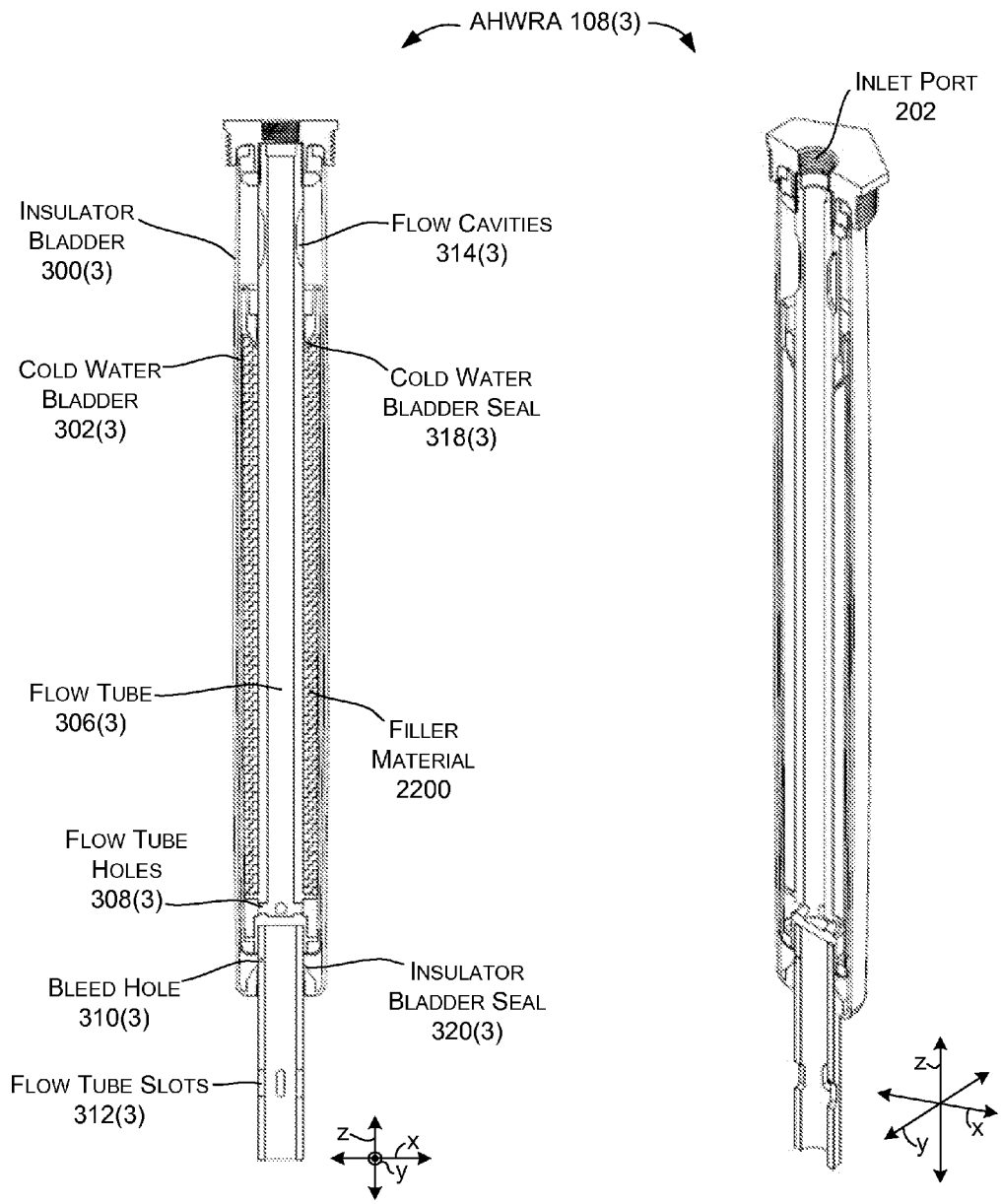

FIGS. 22-35 collectively illustrate another automatic hot water recovery apparatus 108(3). Referring to FIGS. 22 and 23, automatic hot water recovery apparatus 108(3) includes an insulator bladder 300(3), a cold water bladder 302(3), a flow tube 306(3), flow tube holes 308(3), a bleed hole 310(3), flow tube slots 312(3), flow cavities 314(3), a cold water bladder seal 318(3), an insulator bladder seal 320(3), and filler material 2200.

Cold water bladder 302(3) and insulator bladder 300(3) can be elastomeric in nature to aid the operation of the automatic hot water recovery apparatus 108(3) as will be described below. Inlet port 202 can be at the top end of flow tube 306(3) for receiving water into the flow tube. At the lower end of the flow tube, flow tube holes 308(3) can allow water to pass out of the flow tube and into cold water bladder 302(3). At the lower end of the automatic hot water recovery apparatus, flow tube slots 312(3) can allow water to flow out of the automatic hot water recovery apparatus into water heater 106 (FIG. 1).

FIGS. 22 and 23 show the automatic hot water recovery apparatus 108(3) in the steady-state or rest position where hot water has not been used recently. At this point, water pressure at cold water inlet port 202 and flow tube slots 312(3) is generally equal and no water is flowing through the automatic hot water recovery apparatus. Insulator bladder 300(3) and cold water bladder 302(3) can be characterized as being in a resting or non-stretched configuration. The elastomeric bladders can be stretched from this configuration but have a resilient bias to return to this configuration.

Figures 24, 25:
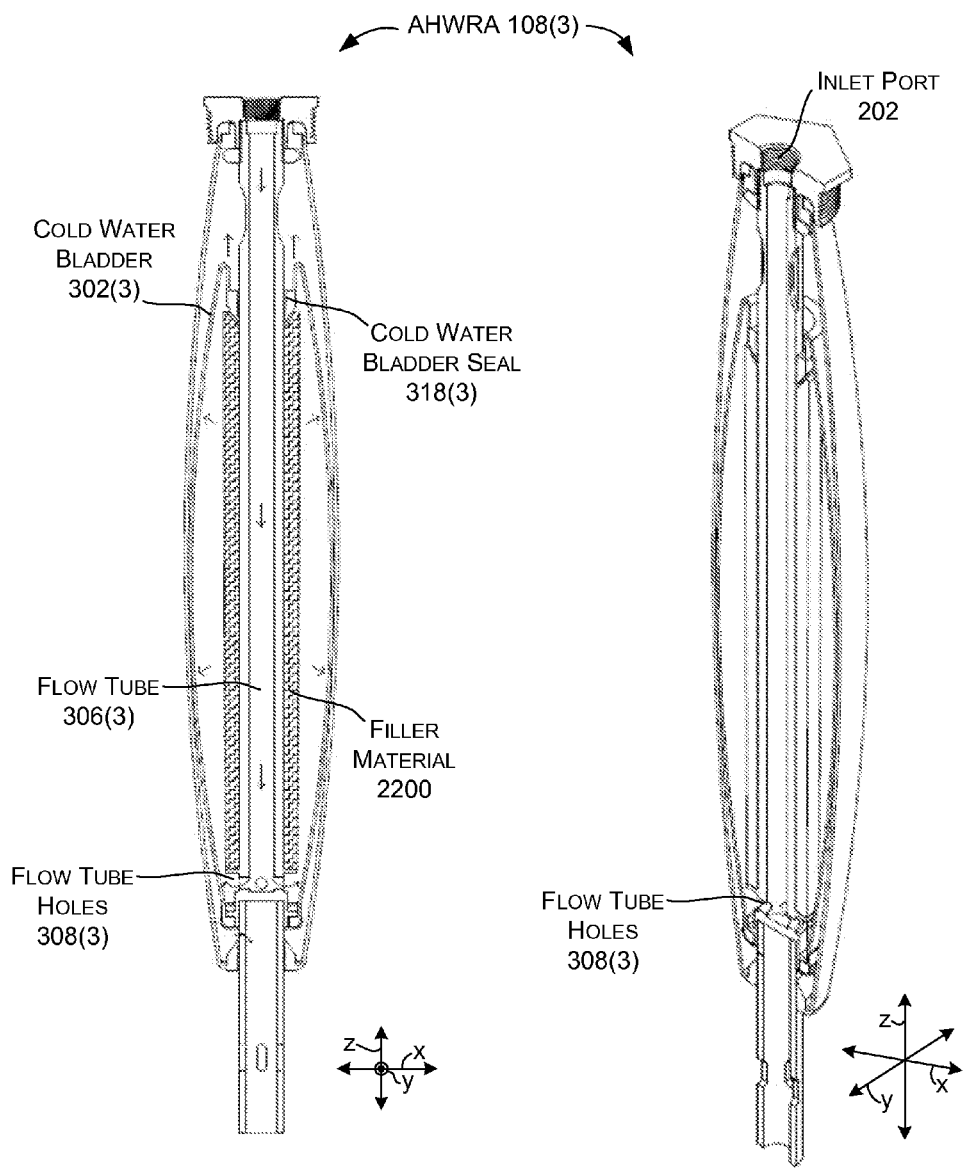

In FIGS. 24 and 25, the hot water is turned on (such as at fixture 110 of FIG. 1). In such a case, water pressure drops at water heater outlet 116 (FIG. 1), and therefore also inside water heater 106 (FIG. 1) but outside automatic hot water recovery apparatus 108(3). As such, the water pressure can be lower on the outside of the automatic hot water recovery apparatus as compared to the inside. The difference in water pressure outside and inside the automatic hot water recovery apparatus can overcome the resilient bias of elastomeric cold water bladder 302(3), causing the cold water bladder to be expanded by water flowing into the automatic hot water recovery apparatus from cold water line 102 (FIG. 1). This can allow water to flow in through inlet port 202 into flow tube 306(3), through flow tube holes 308(3), and into the cold water bladder. In this implementation, the outer wall of the flow tube can be lined with filler material 2200 to reduce/minimize the heat storage capacity of the automatic hot water recovery apparatus in the rest position. The addition of the filler material in this implementation can reduce the reliance on the small flow cavities 304 (FIGS. 5 and 6) of automatic hot water recovery apparatus 108(1), which were used to purge heat that may have accumulated in the cold water bladder during standby.

The incoming cold water at inlet port 202 starts to fill cold water bladder 302(3) which can cause the bladder to further stretch as the resilient bias of the bladder is overcome by the difference in water pressure between the inside and outside of the automatic hot water recovery apparatus 108(3). In this implementation, the cold water bladder expands horizontally (parallel to the x and y-reference axes) and vertically (parallel to the z-reference axis). As the cold water bladder expands in the vertical direction, cold water bladder seal 318(3) can slide vertically (parallel to the z-reference axis), upward along flow tube 306(3). The cold water bladder seal can be mounted so that it can slide vertically along the flow tube while maintaining a water-tight seal against the flow tube.

Figures 26, 27:
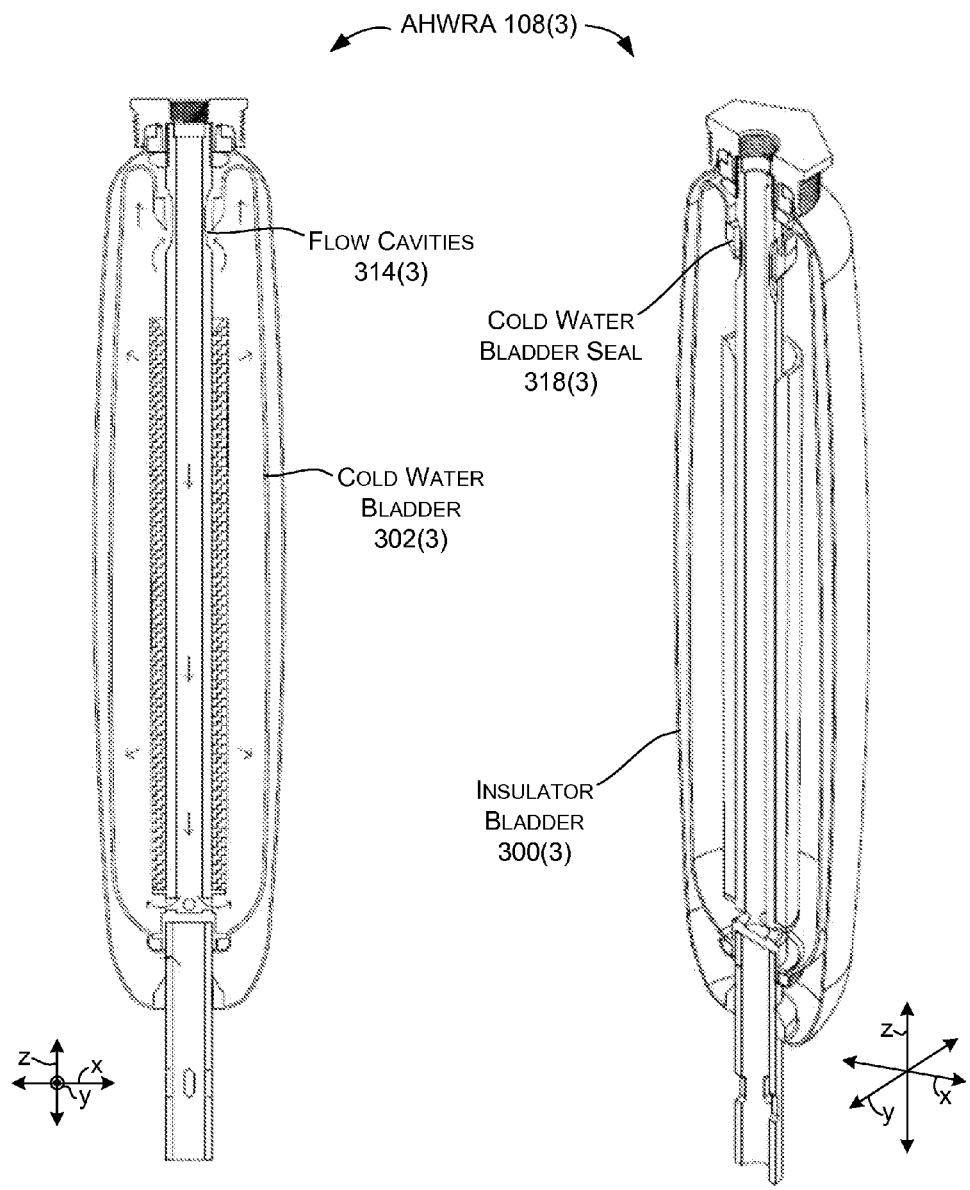

FIGS. 26 and 27 illustrate automatic hot water recovery apparatus 108(3) at a point where cold water bladder seal 318(3) has reached flow cavities 314(3). In this configuration water can flow out of cold water bladder 302(3) into insulator bladder 300(3). At this point the insulator can begin to expand horizontally (parallel to the x and y-reference axes) and vertically (parallel to the z-reference axis). As the insulator bladder expands in the vertical direction, insulator bladder seal 320(3) can slide vertically (parallel to the z-reference axis), downward along the flow tube. The insulator bladder seal can be mounted so that it can slide vertically along the flow tube while maintaining a water-tight seal against the flow tube.

Figures 28, 29:
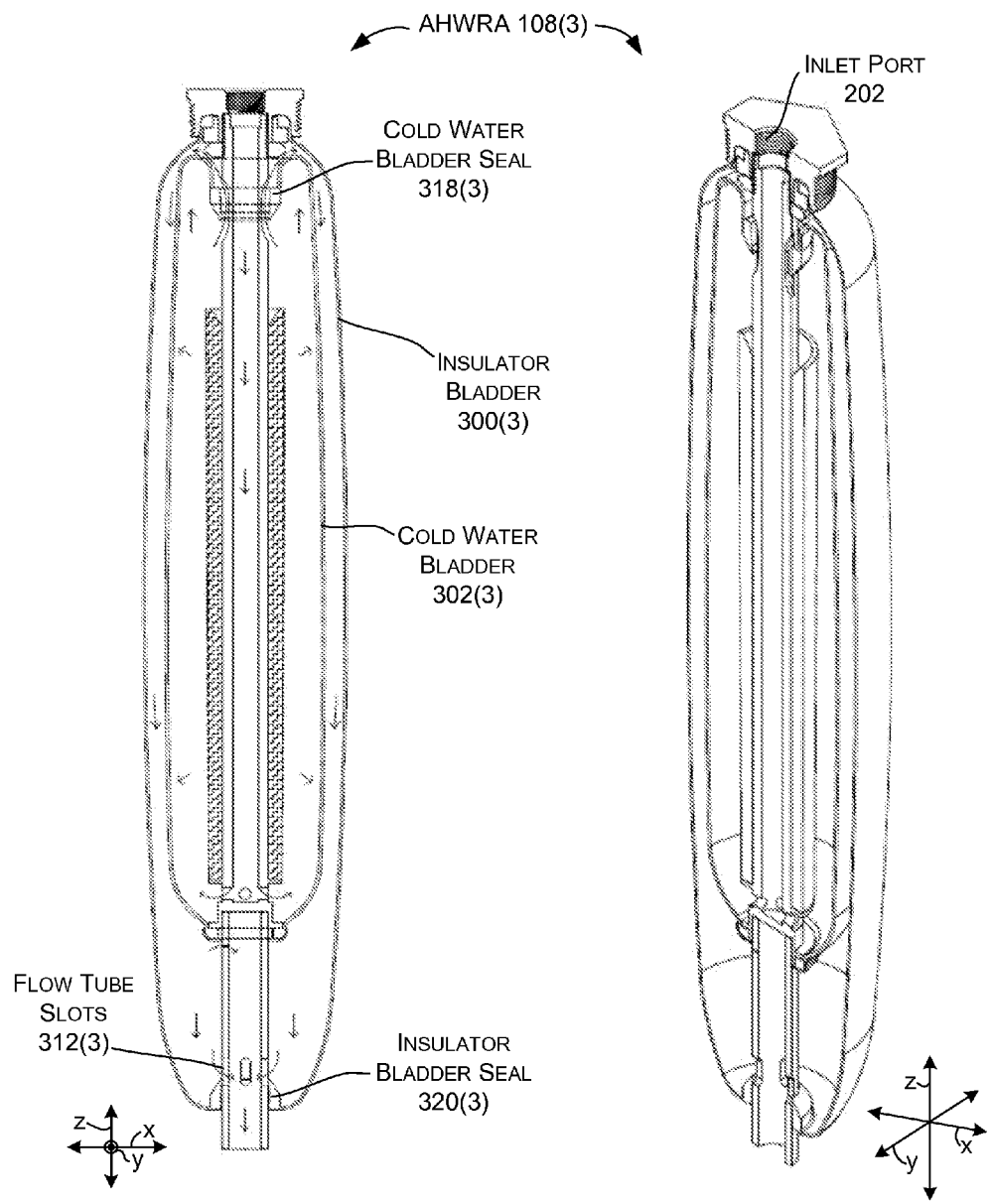

In FIGS. 28 and 29, cold water bladder 302(3) and insulator bladder 300(3) are in fully expanded configurations. Insulator bladder seal 320(3) has moved vertically downward to flow tube slots 312(3), allowing water to flow freely through automatic hot water recovery apparatus 108(3) as hot water is being used. Cold water bladder seal 318(3) and insulator bladder seal 320(3) can remain in this position, and the cold water bladder and the insulator bladder can remain expanded as the water freely flows through the automatic hot water recovery apparatus from cold water inlet port 202 out through the flow tube slots.

Figures 30, 31:
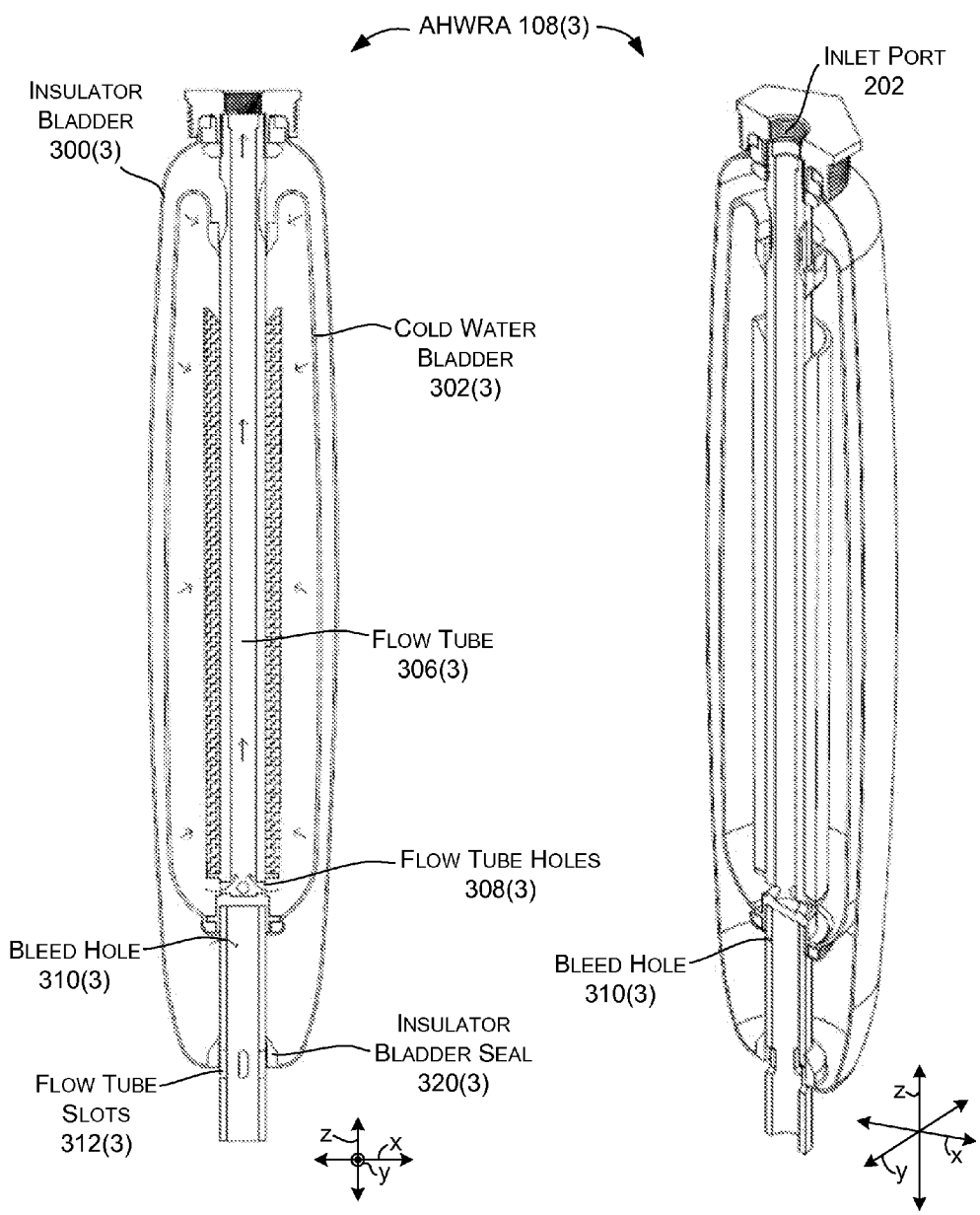

FIGS. 30 and 31 show automatic hot water recovery apparatus 108(3) when the hot water is turned off (such as at fixture 110 of FIG. 1). At this point, the pressure difference between cold water inlet port 202 and flow tube slots 312(3) can lessen. Due to the decreased pressure difference, expanded cold water bladder 302(3) can begin to deflate. Flow of cold water inside the cold water bladder can be reversed, such that water flows out of the cold water bladder through flow tube holes 308(3), into flow tube 306(3), and back out through the inlet port into cold water line 102 (FIG. 1). The expanded insulator bladder 300(3) can also deflate. As both bladders deflate (due to their resilient bias), bleed hole 310(3) can allow some of the volume of water between the bladders to pass into water heater 106 (FIG. 1), allowing the insulator bladder to continue to deflate.

In the configuration shown in FIGS. 30 and 31, insulator bladder seal 320(3) has moved (e.g., slid) vertically upward along flow tube 306(3), such that the insulator bladder seal has risen past flow tube slots 312(3), and water is no longer flowing freely from inside insulator bladder 300(3), through the flow tube slots, and out into water heater 106 (FIG. 1). This implementation can delay drawing water backwards (e.g., from the flow tube slots toward cold water inlet port 202) so that hot water remains readily available to the user. For instance, the user may be running the hot water intermittently as he shaves and brushes his teeth. In this implementation, the delay feature is provided by the fact that the insulator bladder is prevented from collapsing quickly because the space between the insulator bladder and cold water bladder 302(3) is isolated except for bleed hole 310(3). The rate of collapse can be controlled by a small flow of water out of the automatic hot water recovery apparatus 108(3) through the bleed hole. In summary, this feature allows hot water to be (immediately) available to the user for a short period of time after each hot water draw.

Referring to FIGS. 1, 30, and 31, as insulator bladder 300(3) and cold water bladder 302(3) collapse (due to their resilient bias), the flow in hot water line 104 reverses and water is pulled into water heater outlet 116 while water in the bladders of automatic hot water recovery apparatus 108(3) is forced out cold water inlet port 202 into cold water line 102. This action can pull heated water back into water heater 106 from the hot water line extending from the water heater to fixture 110. This scenario leverages cross-over connection 112 introduced above relative to FIG. 1. As the automatic hot water recovery apparatus draws water back along the hot water line and back into the water heater, the pressure in the hot water line can be lower than pressure in the cold water line on the other side of the cross-over connection. Due to this pressure difference, the cross-over connection can allow cold water to flow from the cold water line into the hot water line to replace the volume of water that is drawn back by the automatic hot water recovery apparatus. The energy contained in the heated water that is drawn back into the water heater would otherwise be lost as this water cooled in the hot water line. Of course, some heat loss can occur from the water heater, but the water heater has less relative surface area and tends to be better insulated than the hot water line.

Figures 32, 33:
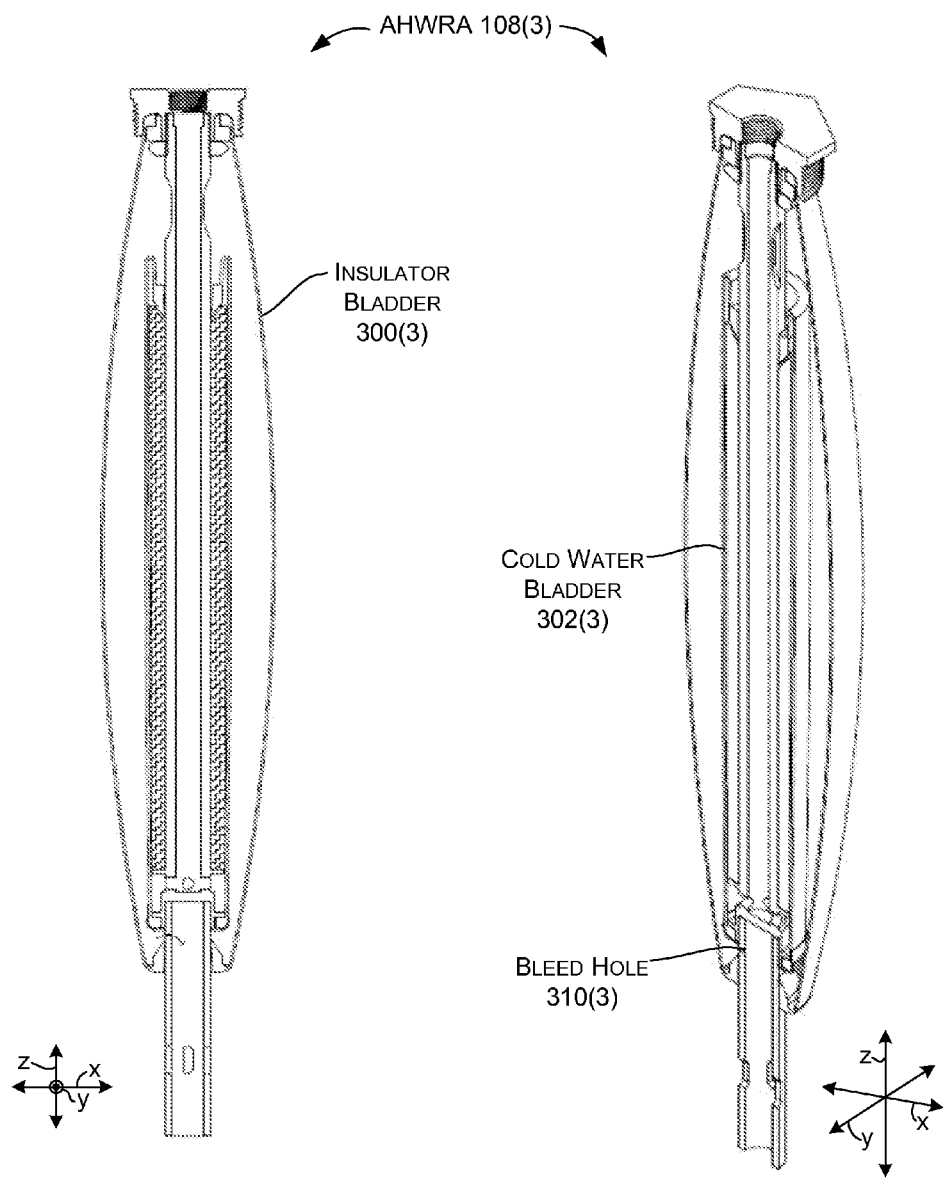
Figures 34, 35:
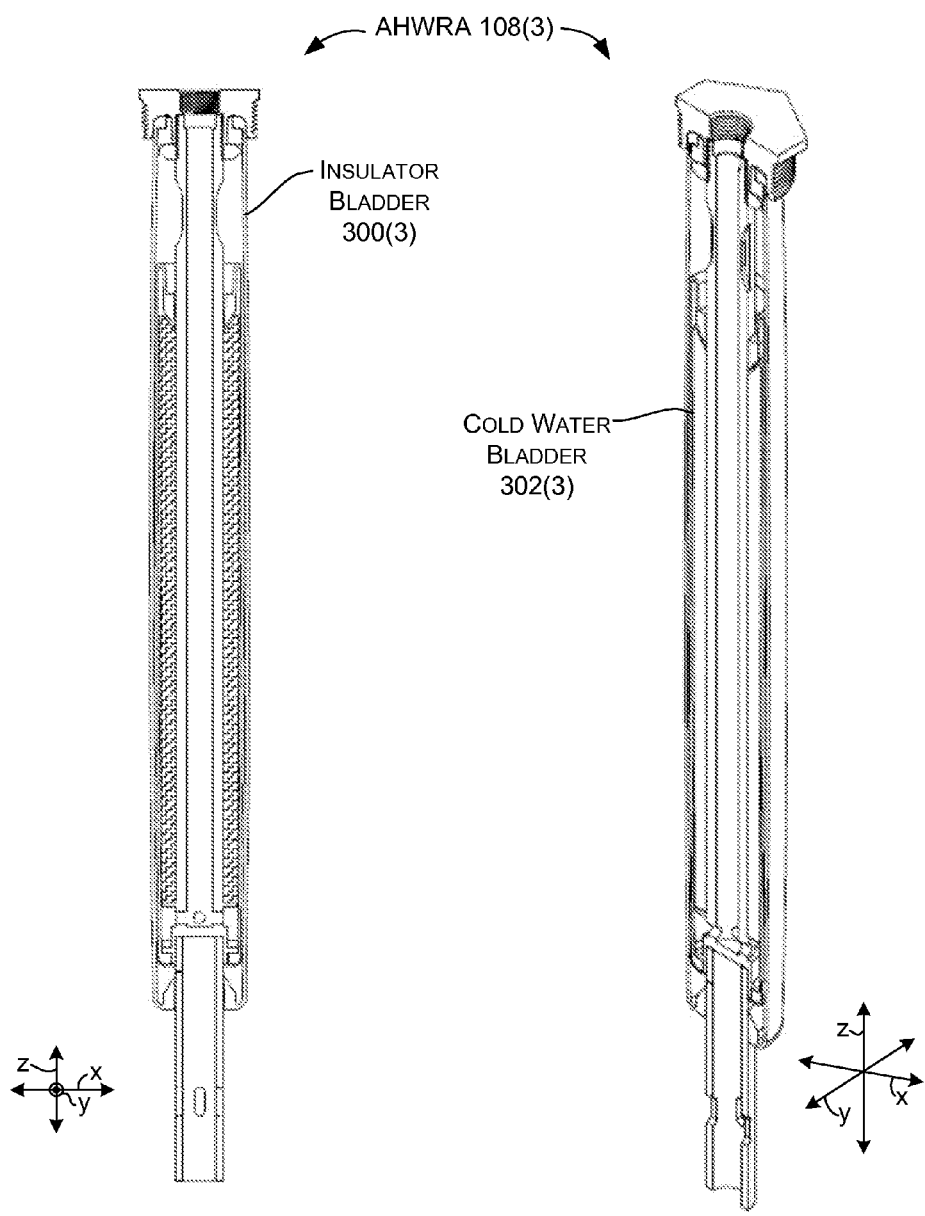

In FIGS. 32 and 33, cold water bladder 302(3) has returned to the deflated, rest position. Insulator bladder 300(3) can continue to deflate, but more slowly, as a small flow of water passes from inside the insulator bladder out through bleed hole 310(3) into the water heater. FIGS. 34 and 35 illustrate automatic hot water recovery apparatus 108(3) in the rest position, with cold water bladder 302(3) and insulator bladder 300(3) deflated.

As noted above, some of the present implementations can reduce mixing of incoming cold water with hot water in the water heater 106 (FIG. 1) since the inflowing cold water can be contained in automatic hot water recovery apparatus 108 (FIG. 1). Furthermore, in one case, cold water bladder 302 (FIGS. 7 and 8) can be expanded and filled with cold water, but the user can stop using the hot water before cold water flows into insulator bladder 300 (FIGS. 7 and 8). At this point the flow can reverse and the bladders can deflate back to their original collapsed, resting configurations. As such, the cold water that is brought into the automatic hot water recovery apparatus can be isolated and insulated from the surrounding hot water in the water heater. This reduction in mixing of the incoming cold water with the hot water in the water heater can allow cold water to be expelled back into the cold water line when the bladders deflate, rather than expelling mixed and therefore heated water back into the cold water line. Energy loss can therefore be reduced by generally preventing a loss of heat from the water heater into the cold water line. Energy loss can also be reduced by reducing heat loss from the hot water line, since at least some of the hot water that could have been stranded in the hot water line can be returned to the water heater.

For instance, consider a scenario where the cold water bladder 302 (FIGS. 7 and 8), when expanded, has a volume of approximately one gallon. For purposes of explanation, assume further that after a period of non-use, a user washes his/her hands at fixture 110 (FIG. 1), using approximately one gallon of hot water, and then does not use any additional hot water for an extended period of time. In that scenario, approximately one gallon of water can pass from cold water line 102 (FIG. 1) into the cold water bladder to replace the volume of the hot water from water heater 106 (FIG. 1) used by the user. Rather than mixing with the hot water in the water heater, the inflowing cold water can be insulated from the remainder of the hot water in the water heater by the cold water bladder and insulator bladder 300 (FIGS. 7 and 8). After use, as the cold water bladder and the insulator bladder contract to their original configurations (FIGS. 17 and 18), the cold water in the cold water bladder can be forced out of the water heater back into cold water line 102 (FIG. 1). As the bladders contract, the one gallon volume inside the water heater which was occupied by the expanded bladders can be replaced by hot water from hot water line 104 (FIG. 1).

Some designs of automatic hot water recovery apparatuses can further contribute to separating cold water and hot water to reduce energy loss. For instance, the illustrated automatic hot water recovery apparatuses 108(1) and 108(3) (FIGS. 11 and 28) include a tortuous path for the incoming cold water to further reduce mixing of cold water and hot water in water heater 106 (FIG. 1). For instance, as illustrated in FIGS. 11-12, cold water is received from the inlet port 202 into the upper end of flow tube 306 (upper and lower relative to the page the FIG. is printed on). The water travels to a lower end of the flow tube before entering cold water bladder 302. The cold water bladder is expanded before water can flow from an upper end of the cold water bladder into an upper end of insulator bladder 300. The insulator bladder is expanded before water can pass from a lower end of the insulator bladder into a lower end of the flow tube and into the water heater. As such, the tortuous path can contribute to reducing or delaying cold water and hot water mixing, especially for limited uses, such as the hand washing use described above.

In summary, several examples of automatic hot water recovery apparatuses are described above. In one implementation, an automatic hot water recovery apparatus can include an elastomeric bladder resiliently biased toward a collapsed configuration. The automatic hot water recovery apparatus can be positioned inside a water heater, and when hot water is turned on at a fixture, the automatic hot water recovery apparatus can receive incoming cold water and expand with the influx of water. In this case, when the hot water is turned off, the resilient bias of the bladder can cause the automatic hot water recovery apparatus to deflate causing cold water to be returned to a cold water line and hot water from a hot water line to be drawn back into the water heater, saving energy.

In other implementations, automatic hot water recovery apparatuses can include multiple resiliently biased bladders. For example, two bladders can be placed in series, such that cold water from a cold water line is drawn into a first bladder and then into a second bladder. For example, a first bladder can be insulated such that cold water inside the first bladder is insulated from the hot water in the water heater. In another example, the first resiliently biased bladder may be positioned inside the second resiliently biased bladder (e.g., nested), such that incoming cold water to the inner bladder is insulated from hot water in the water heater by the outer bladder.

Automatic hot water recovery apparatuses can be integrated with water heaters, or may be added to existing water heaters. Automatic hot water recovery apparatus concepts conveyed in these examples include a delayed hot water drawback option. The delayed drawback feature can be employed in an automatic hot water recovery apparatus that utilizes elastomeric bladders or with other types of automatic hot water recovery apparatuses. Of course, the listing of structures cannot be exhaustive and other structures for accomplishing the novel functions are contemplated.

CONCLUSION

Although specific examples of hot water energy savings are described in language specific to structural features, it is to be understood that the subject matter defined in the appended claims is not intended to be limited to the specific features described. Rather, the specific features are disclosed as exemplary forms of implementing the claimed statutory classes of subject matter.

The invention claimed is:

1. A water flow management device, comprising:
inner and outer nested elastomeric bladders defining a tortuous fluid pathway passing into the inner bladder, through at least one flow cavity between the inner and outer bladders that is at an upper end of the outer bladder, and from the outer bladder out of the water flow management device through at least one flow tube slot at a lower end of the outer bladder that is opposite the upper end,
wherein fluid flowing in the tortuous fluid pathway does not pass from the inner bladder to the at least one flow tube slot and out of the water flow management device without passing through the outer bladder in between the inner bladder and the at least one flow tube slot.

2. The water flow management device of claim 1, further comprising a flow tube that partly defines the tortuous fluid pathway, wherein an upper end of the flow tube is configured to receive a fluid and a lower end of the flow tube is configured to release the fluid to a lower end of the inner bladder, and further wherein the flow tube passes through a center of the inner bladder.

3. The water flow management device of claim 1, wherein the outer bladder is further configured to be immersed in water inside a water heater, and the inner and outer bladders are further configured to cause hot water to be recovered from a hot water line back into the water heater to save energy.

4. The water flow management device of claim 3, wherein the inner and outer bladders are configured to expand from collapsed configurations under a first condition, the first condition comprising a decrease in pressure on the outside of the outer bladder causing a pressure difference between the outside of the outer bladder and a cold water line.

5. The water flow management device of claim 4, wherein due to the expanding, the inner bladder is further configured to receive cold water from the cold water line and the outer bladder is further configured to receive the cold water from the inner bladder.

6. The water flow management device of claim 5, wherein the inner and outer bladders have a resilient bias, the resilient bias configured to cause the inner and outer bladders to return to the collapsed configurations under a second condition, the second condition comprising a lessening of the pressure difference of the first condition.

7. The water flow management device of claim 3, wherein the water flow management device is configured to integrate with a ¾ inch male threaded cold water pipe end and a ¾ inch female threaded coupling of the water heater such that the water flow management device is configured to fit through and connect to the ¾ inch female threaded coupling and configured to receive the ¾ inch male threaded cold water pipe end.

8. The water flow management device of claim 3, wherein the water flow management device is configured to receive a threaded cold water pipe end having a diameter of ½ to 2 inches, and further configured to fit through and connect to a threaded coupling of the water heater, the threaded coupling having a diameter of 2-5 inches.

9. A water heater that includes the water flow management device of claim 1.

10. The water flow management device of claim 1, wherein the water flow management device is configured to be inserted into a water heater by passing the water flow management device as a complete assembly through a coupling of the water heater and connecting the water flow management device to the coupling of the water heater.

11. The water flow management device of claim 10, wherein the water flow management device is further configured to receive an end of a cold water pipe such that cold water flows through the cold water pipe into the inner bladder.

12. The water flow management device of claim 10, wherein the outer bladder is further configured to be immersed in water inside the water heater, and the inner and outer bladders are further configured to cause hot water to be recovered from a hot water line back into the water heater to save energy.

13. A system, comprising:

a water heater; and a water flow management device positioned inside the water heater, the water flow management device comprising inner and outer nested elastomeric bladders defining a tortuous fluid pathway passing into the inner bladder, through at least one flow cavity between the inner and outer bladders that is at an upper end of the outer bladder, from the outer bladder out of the water flow management device through at least one flow tube slot at a lower end of the outer bladder that is opposite the upper end, and into the water heater, wherein fluid flowing in the tortuous fluid pathway does not pass from the inner bladder to the at least one flow tube slot and out of the water flow management device into the water heater without passing through the outer bladder in between the inner bladder and the at least one flow tube slot.

* * * * *